(12) United States Patent
LaVoie et al.

(10) Patent No.: US 8,799,178 B2
(45) Date of Patent: Aug. 5, 2014

(54) SYSTEM AND METHOD FOR SIMULTANEOUS OPTIMIZATION OF LOGISTICS AND PURCHASING

(75) Inventors: Steven LaVoie, LaGrange, IL (US); Shrinivas Sale, Dunlap, IL (US); Michael Robb Swihart, Wheaton, IL (US); Varunraj Valsaraj, Chicago, IL (US); Boyett Judgson Hennington, IV, Chicago, IL (US); Anthony DeFrances, Barrington, IL (US); John William Michalski, Evanston, IL (US)

(73) Assignee: ArrowStream, Inc., Chicago, IL (US)

( * ) Notice: Subject to any disclaimer, the term of this patent is extended or adjusted under 35 U.S.C. 154(b) by 0 days.

(21) Appl. No.: 13/357,393

(22) Filed: Jan. 24, 2012

(65) Prior Publication Data

US 2013/0031017 A1    Jan. 31, 2013

Related U.S. Application Data

(60) Provisional application No. 61/435,563, filed on Jan. 24, 2011, provisional application No. 61/587,999, filed on Jan. 18, 2012.

(51) Int. Cl.
*G06Q 30/00* (2012.01)

(52) U.S. Cl.
USPC .......................................................... 705/330

(58) Field of Classification Search
USPC .......................................................... 705/330
See application file for complete search history.

(56) References Cited

U.S. PATENT DOCUMENTS

| | | | |
|---|---|---|---|
| 5,450,317 A * | 9/1995 | Lu et al. ........................ | 705/7.24 |
| 6,336,362 B1 * | 1/2002 | Duenas ........................... | 73/313 |
| 6,980,966 B1 * | 12/2005 | Sobrado et al. ............... | 705/26.3 |
| 7,263,495 B2 * | 8/2007 | Rodriguez ..................... | 705/7.26 |
| 8,239,229 B1 * | 8/2012 | Paiz ............................... | 705/7.11 |
| 2002/0019759 A1 | 2/2002 | Arunapuram et al. | |
| 2002/0184042 A1 * | 12/2002 | Hommrich et al. ............... | 705/1 |
| 2003/0018502 A1 * | 1/2003 | Rodriguez ........................ | 705/7 |
| 2003/0061084 A1 | 3/2003 | Menninger | |
| 2006/0178918 A1 | 8/2006 | Mikurak | |
| 2007/0027737 A1 * | 2/2007 | Hessedenz ........................ | 705/8 |
| 2008/0140492 A1 | 6/2008 | Rousso et al. | |
| 2008/0183526 A1 | 7/2008 | Hancock et al. | |
| 2009/0187450 A1 * | 7/2009 | Kocis et al. ....................... | 705/8 |
| 2009/0299822 A1 * | 12/2009 | Harari et al. ..................... | 705/10 |
| 2010/0017273 A1 * | 1/2010 | Hommrich et al. .............. | 705/10 |
| 2010/0257114 A1 | 10/2010 | Amling et al. | |
| 2012/0036072 A1 * | 2/2012 | Riggs et al. ...................... | 705/44 |
| 2012/0123673 A1 * | 5/2012 | Perks et al. ..................... | 701/426 |
| 2013/0097664 A1 * | 4/2013 | Herz et al. ........................ | 726/1 |

OTHER PUBLICATIONS

Mishra, A.K., and Tadikamalla, P.R., "Order Splitting in Single Sourcing With Scheduled-Release Orders," Journal of the Operational Research Society, 2006, 57, pp. 177-189.*

PCT, Notification Concerning Transmittal of International Preliminary Report on Patentability, in International application No. PCT/US2012/022402, dated Aug. 8, 2013. (7 pages).

(Continued)

*Primary Examiner* — Nathan Erb
(74) *Attorney, Agent, or Firm* — Barich IP Law Group

(57) ABSTRACT

A system and method that provides optimization of order and routing patterns that solves for optimal freight margin, not just freight cost. The optimization includes freight allowance information typically varying by item that is used to determine ordering and routing solutions. The solutions thus are based on freight impact to total landed product cost, not just load freight costs. Optimization results are then translated into performance targets based on freight margin, not just freight expense.

6 Claims, 16 Drawing Sheets

(56) References Cited

OTHER PUBLICATIONS

PCT, Notification Concerning Transmittal of International Preliminary Report on Patentability, in International application No. PCT/US2012/022391, dated Aug. 8, 2013. (6 pages).

PCT, Notification of Transmittal of the International Search Report and the Written Opinion of the International Searching Authority, or the Declaration, in International application No. PCT/US2012/002391, dated May 25, 2012.

* cited by examiner

Purchasing/Logistics Collaboration Example

430 Current Orders
- 6 total inventory turns
- Product A: Avg 21 Days on Hand

470 New Order/Routing Plan
- 8 total inventory turns
- Product A: Avg 17.25 Days on Hand

480 Purchasing Results
- ✓ Increased overall turns by 33%
- ✓ Reduced product A DOH by 18%
- ✓ Predictable order patterns Supplier/Product A
21 Avg Days On Hand
1,980 cs
1,980 cs Supplier/Product B
21 Avg Days On Hand
992 cs
1,210 cs
880 cs
1,650 cs 990 cs
990 cs
990 cs
990 cs
1,183 cs
1,183 cs
1,183 cs
1,183 cs Chicago, IL
Indianapolis, IN
Atlanta, GA

420 Current Replenishment Patterns
450 New Replenishment Patterns

ITM Lane Import Criteria

Search

| Ptnr Master | | Ship-to State | | S / CWT | | Mth Freq | |
|---|---|---|---|---|---|---|---|
| Partner | | Ship-to Zip | | Rate / Mile | | Mth Freight | |
| AS Vendor # | | Ship-from State | | Avg Freight | | Mth Weight | |
| Vendor # | | Ship-from Zip | | Avg Weight | | Lane Status | |
| Vendor Name | | Ship Via | | Avg Cube | | Stage | |
| Buy Group | | Temp Protect | | Avg Pallets | | Order By | |
| Brand | | Distance (Miles) | | Fusion Rules | None | | search |

Matching Items

| | | Ship From | | | | | Average | | | | | Master (AS) | | Mth | | Fusion |
|---|---|---|---|---|---|---|---|---|---|---|---|---|---|---|---|---|
| Lane # | Vendor # | Name | City | State | TP | Partner | Freight | Weight | Cube | Plt | Brand | Vendor # | Lane Status | Freq | Grade | Applied |
| 221886 | 9200901 | Family - Burger Vendor | Reedville | VA | F | Dst02-CO | 1093.95 | 36309 | 1836 | 29 | | 9999999 | DA Lane -Poor RT(Sys) | 1 | A | ✓ |
| 209927 | 8754003 | Family Foods Inc | Reedville | VA | FR | Dist03-NY | 2219.96 | 39458 | 1993 | 26.9 | | 9999999 | MA Lane- >$5K/Mo | 14 | A | |
| 209927 | 8754003 | Family Foods Inc | Reedville | VA | FR | Dist03-NY | 2219.96 | 39458 | 1993 | 26.9 | | 9999999 | MA Lane- >$5K/Mo | 14 | A | |
| 209927 | 8754003 | Family Foods Inc | Reedville | VA | FR | Dist03-NY | 2219.96 | 39458 | 1993 | 26.9 | | 9999999 | MA Lane- >$5K/Mo | 14 | A | |
| 237076 | 545 | Family Foods Inc (BV) | Reedville | VA | D | Dst04-VA | 1977.33 | 26403 | 1445 | 20.2 | | 9999999 | MA Lane- $1-5K/Mo | 2.50 | A | |
| 209890 | 710937 | Red's Quality Foods Inc* | Reedville | VA | DR | Dst05-NC | 3378.55 | 41094 | 1677 | 27 | | 9999999 | DA Lane | 1 | B | |
| 221810 | 545 | Family Foods Inc (BV) | Reedville | VA | DR | Dst04-MD | 1518.14 | 41864 | 1998 | 26.5 | | 9999999 | MA Lane->$5K/Mo | 8 | A | ✓ |
| 218586 | 545 | Family Foods Inc (BV) | Reedville | VA | DT | Dst04-NC | 872.84 | 40601 | 1917 | 25.6 | | 9999999 | MA Lane- $1-5K/Mo | 3 | A | |
| 153519 | 476 | Family Foods Chicken (BV) | Reedville | VA | DTFR | Dst01-MD | 1063.22 | 39689 | 1973 | 27 | | 9999999 | MA Lane->$5K/Mo | 17 | A | |
| 153519 | 476 | Family Foods Chicken (BV) | Reedville | VA | DTFR | Dst01-MD | 1063.22 | 39689 | 1973 | 27 | | 9999999 | MA Lane->$5K/Mo | 17 | A | |
| 153519 | 476 | Family Foods Chicken (BV) | Reedville | VA | DTFR | Dst01-MD | 1063.22 | 39689 | 1973 | 27 | | 9999999 | MA Lane->$5K/Mo | 17 | A | |
| 153519 | 476 | Family Foods Chicken (BV) | Reedville | VA | DTFR | Dst01-MD | 1063.22 | 39689 | 1973 | 27 | | 9999999 | MA Lane->$5K/Mo | 17 | A | |
| 153519 | 476 | Family Foods Chicken (BV) | Reedville | VA | DTFR | Dst01-MD | 1063.22 | 39689 | 1973 | 27 | | 9999999 | MA Lane->$5K/Mo | 17 | A | |
| 152556 | 64800505 | Tony's Seafood Corp | Reedville | VA | DTFR | Dst05-GA | 485.32 | 14567 | 374 | 8 | | 9999999 | MA Lane- No Rate | 1 | A | ✓ |

FIG. 7

| Combo Constraints | | Cost Settings | |
|---|---|---|---|
| Load Size Constraints | Setting | | Settings |
| Max Weight per TL dry | 44,000 | FSC ($ / mile) | 0.58 |
| Max cube per TL dry | 3,000 | PPG ($) | 4.000 |
| Max pallet per TL dry | 28.0 | FSC chart | |
| Max weight per TL reefer | 42,500 | FSC standard | No standard |
| Max cube per TL reefer | 2,800 | Cost per stop ($) | 75 |
| Max pallet per TL reefer | 28.0 | Flexing Constraints | |
| Lane Constraints | | Enforce shelf life | Yes |
| Use only low risk lanes | No | Min shelf life for flexing (days) | 45 |
| Min freight per lane ($) | 100 | Inv constr (weeks) | 3 |
| Financial Constraints | | Max flex factor | 3.0 |
| Min margin (%) | 0 | Solution Constraints | |
| Min margin ($) | 0 | Permit cross combos | No |
| Incremental margin-existing (%) | 0 | Incl/Excl current combos | Exclude |
| Incremental margin-OneWay (%) | 0 | Max lanes per combo | 4 |
| Min incr savings for add'l lanes( | 0 | Max total stops per combo | 5 |
| | | Max out of route miles | 500 |
| | | Max out of route percent (%) | 50 |
| | | Max dist vendor | 500 |
| | | Max dist DC | 500 |
| | | Min solution truck load size (%) | 10 |
| | | Max solution truck load size (%) | 100 |

FIG. 8

ITM Scenario Detail

Scenario information for Project - Family Restaurant 11

| | | |
|---|---|---|
| Scenario ID: 170001-01 | Date Created: 01/16/12 11:09AM | |
| Name: Family Restaurant Scenario 1 | Last Modified: 01/20/12 3:57AM | |
| Desc: Family Restaurant November Mining | Last Run: 01/21/12 9:42 AM | |
| Solutions: LT(1), 1W(2), C(3) | Elapsed Time: 14m, 23s | |

Scenario Notes

Results
- savings $6,118,305 (23.4%)
- loads -12.7%
- PO's -2.7%
- Inventory +5.9%
- miles -11.2%
- utilization +15.9%

○ Scenario ● Published

1 - Set Up (910)

Lane Data

| Source | Data Set Name | Loaded | Modified | Records | Actions |
|---|---|---|---|---|---|
| Excel | Family Restaurants US | 01/06/2012, 11:09:23 AM | 01/07/2012, 08:45:23 AM | 12,867 | |
| AIMS | Weekly Mining 001 | 01/07/2012, 11:09:23 AM | 01/09/2012, 05:09:23 AM | 10,825 | |
| AIMS | Weekly Mining 002 | 01/07/2012, 11:09:23 AM | 01/09/2012, 05:09:23 AM | 10,825 | |

Scenario Constraints & Overrides

Model
- LT (LI)
- OneWay (1W)
- Combo (CB)

2 - Optimize (920)

Models

| Model | Description | Add Model | Schedule | Run | | |
|---|---|---|---|---|---|---|
| | | Elapsed Time | Model Constraint | Solutions | Savings | |
| Combo | Combo Model Description 1 | 12 min, 3 sec | No Override | 10 | $51,603 | |
| Combo | Combo Model Description 2 | 12 min, 23 sec | No Override | 12 | $46,911 | |
| Combo | Combo Model Description 3 | 14 min, 45 sec | No Override | 14 | $56,294 | |
| LTL | LTL Model Description 1 | 8 min, 9 sec | Override | 8 | $21,110 | |
| OneWay | OneWay Model Description 1 | 10 min, 17 sec | No Override | 22 | $28,147 | |

Model Results

| | PO | Inv | Loads | Util | Miles |
|---|---|---|---|---|---|
| LT(LI) | -1.4% | +2.3% | -5.2% | +12.3% | -3.1% |
| OneWay (1W) | -1.8% | +2.9% | -6.1% | -12.9% | -5.6% |
| Combo (CB) | -2.1% | +4.6% | -10.5% | +14.6% | -9.3% |
| | -2.7% | +5.9% | -12.7% | +15.9% | -11.2% |
| | -2.1% | +4.6% | -10.5% | +14.6% | -9.3% |

3 - Review (930)

Scenario Solution Detail — ☑ 10 solutions locked

Export  Publish Marked

| Status | | | Lock | | | | | | | Load | | | Mth Margin | | | | | | 1st Pick / Last Drop | | | | |
|---|---|---|---|---|---|---|---|---|---|---|---|---|---|---|---|---|---|---|---|---|---|---|---|---|
| Publish | New | Excl | Lock | Type | Description | Lanes | Wgt | Cube | Pl't | Freq | Inv % | Amount | % | Cost | Margin | Rev | Temp | Name | City | St | Zip | Miles |
| ☐ | ⊞ | | | OneWay | OneWay 1 | 3 | 42500 | 2500 | 26 | 1.45 | 2.1% | $123,456 | 31% | 1100 | | $1,223 | D | Cargill | Newark | NJ | 12345 | 550 |
| ☐ | ⊞ | | | Combo | Combo 2 | 3 | 42500 | 2500 | 28 | 3 | 34% | $123,456 | 34% | 2300 | | $2,523 | R | Tyson | Dallas | TX | 75201 | 600 |
| ☐ | ⊞ | | | Combo | Combo 3 | 3 | 42500 | 2500 | 28 | 3 | 34% | $123,456 | 34% | | | | R | Tyson | Dallas | TX | 75201 | 600 |
| ☐ | ⊞ | | | Combo | Combo 2 | 3 | 42500 | 2500 | 28 | 3 | 34% | $123,456 | 34% | | | | R | Tyson | Dallas | TX | 75201 | 600 |
| ☐ | ⊞ | | | Combo | Combo 2 | 3 | 42500 | 2500 | 28 | 3 | 34% | $123,456 | 34% | | | | R | Tyson | Dallas | TX | 75201 | 600 |

◉ Lane Analysis: 0 of 0, Carrier Procurement: 0 of 0, Purchasing 0 of 0

☐ Validated  ☒ Unvalidated  ☒ Iss

| | Cases | Weight | Cube | Pallets | Basis: Default SKU | | | | Default SKU | | |
|---|---|---|---|---|---|---|---|---|---|---|---|
| | | | | | Frt $ | $/Mi | $/Wgt | Frt $ | $/Mi | $/Wgt | |
| Minimum | 503 | 18641 | 64 | 13.97 | 2472.36 | 2.997 | 0.13263 | 2472.36 | 2.997 | 0.13263 | |
| Average | 503 | 18641 | 64 | 13.97 | 2472.36 | 2.997 | 0.13263 | 2472.36 | 2.997 | 0.13263 | |
| Median | 503 | 18641 | 64 | 13.97 | 2472.36 | 2.996 | 0.13263 | 2472.36 | 2.997 | 0.13263 | |
| Maximum | 503 | 18641 | 64 | 13.97 | 2472.36 | 2.997 | 0.13263 | 2472.36 | 2.997 | 0.13263 | |
| Avg Wkly Usage | 0 | 0 | 0 | 0.0 | 0.00 | 0.000 | 0.00000 | 0.00 | 0.000 | 0.00000 | |

[Close]  [Item List]  [Create Profile]  [Regen]

⟵ 1110

| PO # | Cases | Weight | Cube | Pallets | Frt $ | $/Mi | $/Wgt | TP | Rec Date | Comp | Ship Via | LT | Bill Basis | Rate Usage |
|---|---|---|---|---|---|---|---|---|---|---|---|---|---|---|
| SC080751-16 | 648 | 24014 | 826 | 18 | 2472.36 | 2.997 | 0.10295 | F | 2/9/2012 | | Arrowstream | | dflt sku | Default SKU |
| SC080751-15 | 648 | 24014 | 826 | 18 | 2472.36 | 2.997 | 0.10295 | F | 1/26/2012 | | Arrowstream | | dflt sku | Default SKU |
| SC080751-14 | 648 | 24014 | 826 | 18 | 2472.36 | 2.997 | 0.10295 | F | 1/12/2012 | | Arrowstream | | dflt sku | Default SKU |
| SC080751-13 | 648 | 24014 | 826 | 18 | 2472.36 | 2.997 | 0.10295 | F | 12/29/2011 | | Arrowstream | | dflt sku | Default SKU |
| SC080751-12 | 648 | 24014 | 826 | 18 | 2472.36 | 2.997 | 0.10295 | F | 12/15/2011 | | Arrowstream | C | dflt sku | Default SKU |

Subroute: DEMO AFD FR/SR1

Load Rules ⓘ  *-Net Weights and Net Cubes  Order Rules  Financial Targets

| Load Level Rules | Driver | Cases | Wgt' | Cube' | Plts | Frt $ | Rev $ | Exp $ | GM $ |
|---|---|---|---|---|---|---|---|---|---|
| | | | >38000 | | >26 | >3750 | 3823.00 | 2861.84 | 961.16 (25.1%) |
| Estimated Load Total | Pallets | 1048 | 40414 | 1604 | 28.0 | 3556.36 | 3556.36 | 2754.84 | 801.52 (22.5%) |

PO Rules

| Lane | | Transit Rules | | | | | | Order Rules | | | Financial Targets | | |
|---|---|---|---|---|---|---|---|---|---|---|---|---|---|
| DC / Ship-To | Vendor / Ship From | Pickup / Delivery Days | Sch P/U | Sch Div | Cases | Wgt# | Cube# | Plts | Frt $ | Rev $ | Exp $ | GM $ |
| AFD-CO 8250-AFD - Denver, CO PO # AFD79452-14-c08 (SC079452-14) | Bakery PRODUCTS Brands Eagan, MN PO Type: DC | P/U: - Mo Tu We - - Div: - We Th Fr - - Load # TR Days: 2 | 1/9/12 | Seq = 1 Seq = 2 | 400 | >18000 16400 | 778 | >11 10.0 | >1150 1084.00 | 1365.36 1084.00 | 1022.09 963.87 | 343.27 100.13 |
| AFD-CO 8250-AFD - Denver, CO PO # AFD80751-14-c08 (SC079452-14) | -O INC Cold Storage = St Cloud, MN PO Type: DC | P/U: - Mo Tu We - - Div: - We Th Fr - - Load # TR Days: 2 | 1/9/12 1/12/12 | Seq = 1 Seq = 3 | 648 | >18000 24014 | 826 | >15 18.0 | >2600 2472.36 | 2457.64 2472.36 | 1839.75 1770.97 | 617.89 701.39 |

SYSTEM AND METHOD FOR SIMULTANEOUS OPTIMIZATION OF LOGISTICS AND PURCHASING

CROSS-REFERENCE TO RELATED APPLICATIONS

The present application claims the benefit of U.S. Provisional Application No. 61/435,563, filed Jan. 24, 2011, entitled "System and Method For Transportation Management" and also claims the benefit of U.S. Provisional Application No. 61/587,999, filed Jan. 18, 2012, entitled "System and Method For Transportation Management," both of which are hereby incorporated by reference in their entirety.

BACKGROUND OF THE INVENTION

The present invention generally relates to a system and method for logistics. More particularly, the present invention relates to a system and method for improving logistics cost, trailer utilization, number of truck used, or miles driven.

Logistics involves the transportation of goods from a source to a destination. Typically, the source is a seller of goods such as a manufacturer and the destination is a buyer of goods such as a retailer. Moving goods between the source and destination at the lowest possible cost has long been a goal of logistics and numerous prior art systems and methods have been developed in an attempt to do so.

BRIEF SUMMARY OF THE INVENTION

One or more embodiments of the present invention a logistics system that optimizes order and routing patterns and that solves for optimal freight margin, not just freight cost. The optimization includes freight allowance information typically varying by item that is used to determine ordering and routing solutions. The solutions thus are based on freight impact to total landed product cost, not just load freight costs. Optimization results are then translated into performance targets based on freight margin, not just freight expense.

BRIEF DESCRIPTION OF THE DRAWINGS

FIG. 4 illustrates the example of FIG. 3 at an inventory rather than a lane level.

FIG. 6 illustrates a screen shot of an Inbound Transport Management (ITM) system according to an embodiment of the present invention.

FIG. 7 illustrates a screenshot of the ITM lane import criteria screen.

FIG. 8 illustrates a screenshot of the constraints preferably entered for the implementation of the combo model of FIG. 2.

FIG. 9 illustrates a screenshot of an ITM scenario analysis screen providing a view of optimization solutions with the ability to lock, exclude, and mark solutions for publication.

FIG. 10 illustrates a screenshot of a lane profiles tool for visualization and what-if analysis of lane optimization and order flexing results.

FIG. 11 illustrates a screenshot of a lane analysis tool used to examine shipment, purchase order, inventory, and sales information summarized to a lane level to support order and route pattern determination.

FIG. 12 illustrates a screenshot of lane order profiles which include purchasing guidelines for communication to purchasing systems or processes.

FIG. 13 illustrates a screenshot of the compliance detail.

DETAILED DESCRIPTION OF THE INVENTION

Figure 1:
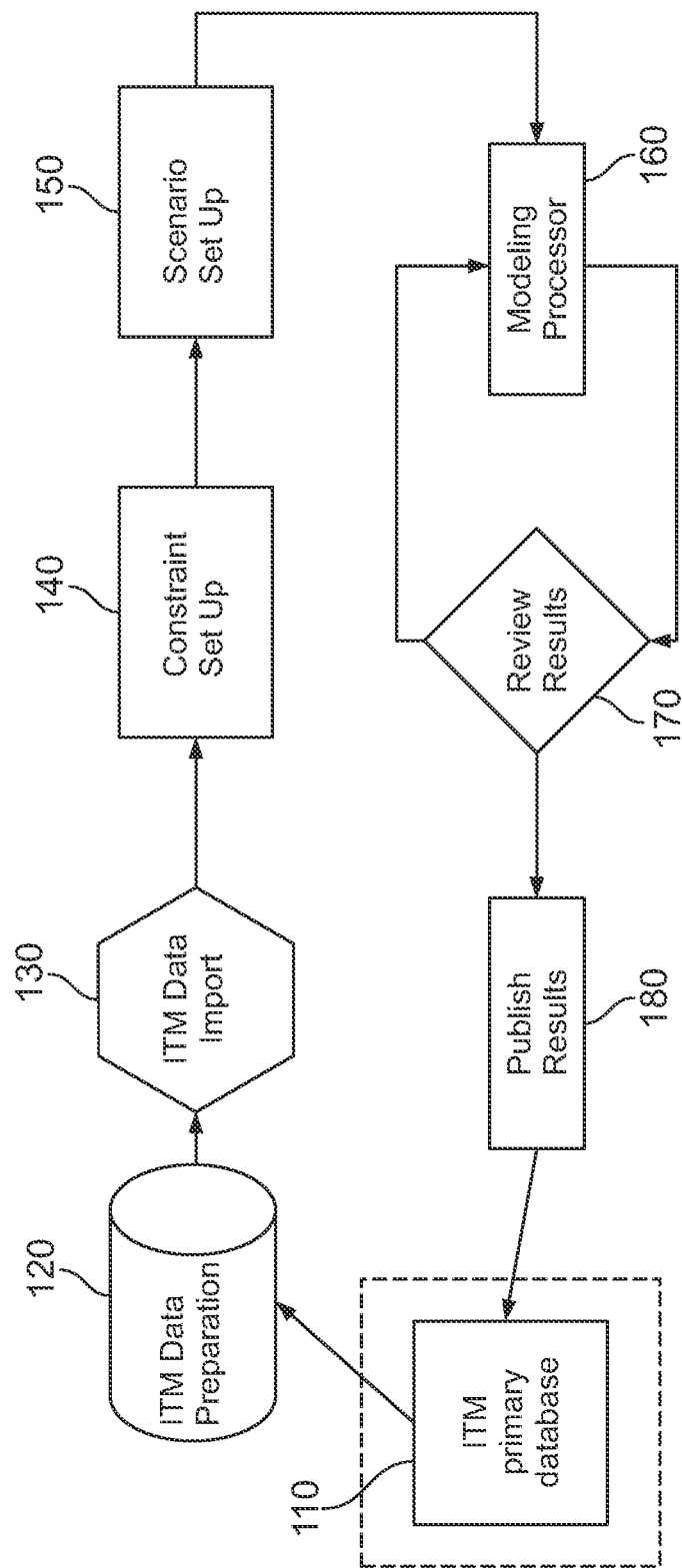
FIG. 1 illustrates a system for logistics optimization using lane order pattern flexing according to an embodiment of the present invention.

FIG. 1 illustrates a system for logistics optimization 100 using lane order pattern flexing according to an embodiment of the present invention. The system for logistics optimization 100 includes an Inbound Transportation Management (ITM) primary database 110, an ITM data preparation processor 120, an ITM data importer 130, a constraint set-up processor 140, a scenario set-up processor 150, a modeling processor 160, a model results viewing application 170, and a results publisher 180.

In operation, ITM data is retrieved from the ITM database 110 by the ITM data preparation processor 120. Preferably, the data is retrieved or refreshed nightly, but may be retrieved or refreshed in other intervals such as weekly, hourly, monthly, or continuously. The ITM data preferably includes purchase order (PO) information with regard to each purchase order passing through the ITM system, but may instead operate with a subset of all of the available purchase orders. In addition to the PO information, the ITM data preferably includes item information for all of the items shipped in each of the POs. The ITM data may be retrieved from a remote site such as a data center, for example. The system for logistics optimization 100 may be co-located or remotely located from the data center.

Next, at the ITM data preparation processor 120, the item data is aggregated at the PO level. For example, individual items that were historically purchased during the last 60 days are combined into a single or multiple POs representing a re-ordering of the same items during the next 60 day period. Additionally, data from the PO level may be taken and aggregated into a frequency and load size for the lane. This may be viewed as a theoretical set of POs. For example, a frequency of four and a load size of 40,000 lbs may be viewed as four POs in the next time period at 40,000 lbs each.

In addition to historical information, other data may be employed. For example, forecast information may be employed such as for highly seasonal products, for example. Additionally, third party information such as lanes that are currently serviced by a third party, either inbound or backhaul, may be used. Additionally, instead of PO history, distribution center use or sale of items, or other inventory information may be used.

Additionally, the PO data is aggregated at the lane level. A lane preferably includes a unique combination of 5 elements, partner identification, vendor number, original location, destination location, and temperature protection (TP). Partner identification is an identification of the company receiving the goods. Vendor number is an identification of the vendor selling the goods. Original location is an indication of where the goods are first picked-up or ship from. Destination location is an indication of where the goods are eventually intended to arrive. Temperature protection is an indication of whether the goods much remain refrigerated, frozen, or if no temperature protection is needed. Although in the above example 5 elements are used when setting a lane, a greater or lesser number of elements may be employed.

As mentioned above, the PO data is aggregated at the lane level. That is, for each lane, all POs associated with a specific lane during the previous 60 days are electronically associated an identification of the specific lane. Additionally, the data can be for lanes that the user's company is not currently moving, so that the tool can be used to optimize them in order to try to bring in more freight under management.

Next, the associated data is passed to the ITM data importer 130. The ITM data importer 130 filters the data and enters the data in an optimization module as further described below. For example, when filtering the data, the ITM data importer 130 presents several choices or options to a user. The user may then filter the network as desired. For example, a user may only want a subset of the distribution centers in a network, such a subset may represent a geographic area such as the east coast, for example. Further, a user may be interested in filtering the data in this way for any of several reasons, for example the user may have a new customer in the east coast area and be looking to determine the impact on logistics in the area.

Additionally, the user may filter by temperature requirement, such as refrigerated vs. non refrigerated, or by the other options shown in the screen shot.

Additionally, the ITM data importer summarizes the imported data by displaying the imported data for a user, for example, for displaying the data by lane. Additionally, the ITM data importer performs a quality check to identify missing information in the imported data. That is, for the imported attributes, the ITM data importer identifies the lanes with missing information and presents them to the user. For example, for the attribute of "weight", the ITM data importer may determine the total number of lanes with no weight, and the total revenue and other aspects associated with those lanes, and then present those lanes to the user. Similarly, the ITM data importer may give total number of lanes missing cubic feet (cube) or pallet.

For example, the ITM data importer may identify the total number of lanes with any quality issue (missing any of weight, cube, or pallet) and provide a link to the lane so that the user can review the lane and attempt to determine what is wrong or enter in the missing data. Alternatively, the user is provided with the option to exclude lanes with incomplete data from the analysis.

Finally, the ITM data importer preferably displays a graphical view of the data including plot vendor maps, data center map, and lane map for the imported data.

Alternatively, filtering of data may be done in the normal manner of data base based on the criteria that the user enters, that is, a user might specify lanes going to a specific distribution center, or exclude lanes with a weight below a certain amount.

Alternatively, with regard to the quality check, the quality check may do separate summaries of lanes that are missing weight info, missing cube info, missing ship from info, etc. and then permit the user to find the individual lanes that fall into each category. For example, the quality check may report that there are 23 lanes missing weight with a total revenue of $53,121 per month, and 45 lanes missing cube with a total rev of $43,634 per month, etc. The 23 lanes missing weight may also include lanes that are in the 45 missing cube.

Next, the imported data is passed to the constraint set-up processor 140. At the constraint set-up processor, global constraints are established for the modeling process as further described below. However, such global constraints may later be overwritten at the scenario level and/or the model level.

Next, the scenario set-up processor 150 is used to specify models that constitute a scenario, as further described below. The scenario set-up processor 150 may also specify data and set constraints used for optimization as further described below.

Next, at the modeling processor 160, all of the models for a specific scenario are run, as further described below. The modeling processor 160 includes an optimization engine that provides optimized solutions in accordance with the specified scenario and constraints. The solutions from the optimization engine are obtained. Further, an optimization log is provided so that the optimized solutions may be stored in the optimization log.

Next, the results of the modeling processor 160 are reviewed at the model results viewing application 170. At the model results viewing processor 160, several options are available. First, a specific solution or option may be locked or excluded based on the review. The solutions may also be excluded from future models so that a user need not re-reject the solution. Additionally, when locked, the solution is forced to come up again during the next solution determination. For example, even if the modeling processor 160 determines that a certain solution with a certain number of specific lanes is one of the desirable solutions, a reviewer may choose to discard the solution or discard specific lanes for reasons not related to profitability. As another example, a lane or solution may be chosen that has a specific truck in a specific city on a specific day or on weekends so that a driver may visit family.

Additionally, the results viewing application 170 allows the reviewer to publish a solution or mark a solution for publication. That is, a particular chosen solution may be shared with other people in the company, such as purchasing employees, to make sure that the proposed solution provides for the needs of the purchasing employees as well—for example, with regard to inventory turns and desired stockpiles of inventory. The results viewing application 170 also makes a profile. The profile may be passed between employees to obtain consensus as to the solution.

Also, after any change to a parameter of the model, such as locking or deleting a solution or lane, the model may be re-run to display a new set of solutions which may then be further analyzed and potentially modified by the user as desired.

Once a desired solution is determined and agreed to by all responsible employees, for example, both logistics and purchasing employees, the results publisher 180 publishes the results to the ITM database 110 to create a solution profile in the ITM database 110. Alternatively, the solution profile may have already been published and solution profile may now be made active. By publishing the results to the ITM database 110, the actual logistics instructions for the company are changed. For example, the company's goods will now be shipped to the company based on the shipping/logistic instructions that are now published to the ITM database 110 rather than previous instructions. Note however, that the published results sent to the ITM database 110 may but need not change all of the previous logistics instructions.

In addition, the results publisher keeps a summary and/or copy of the result published to allow for later analysis and potential modification.

Figure 2:
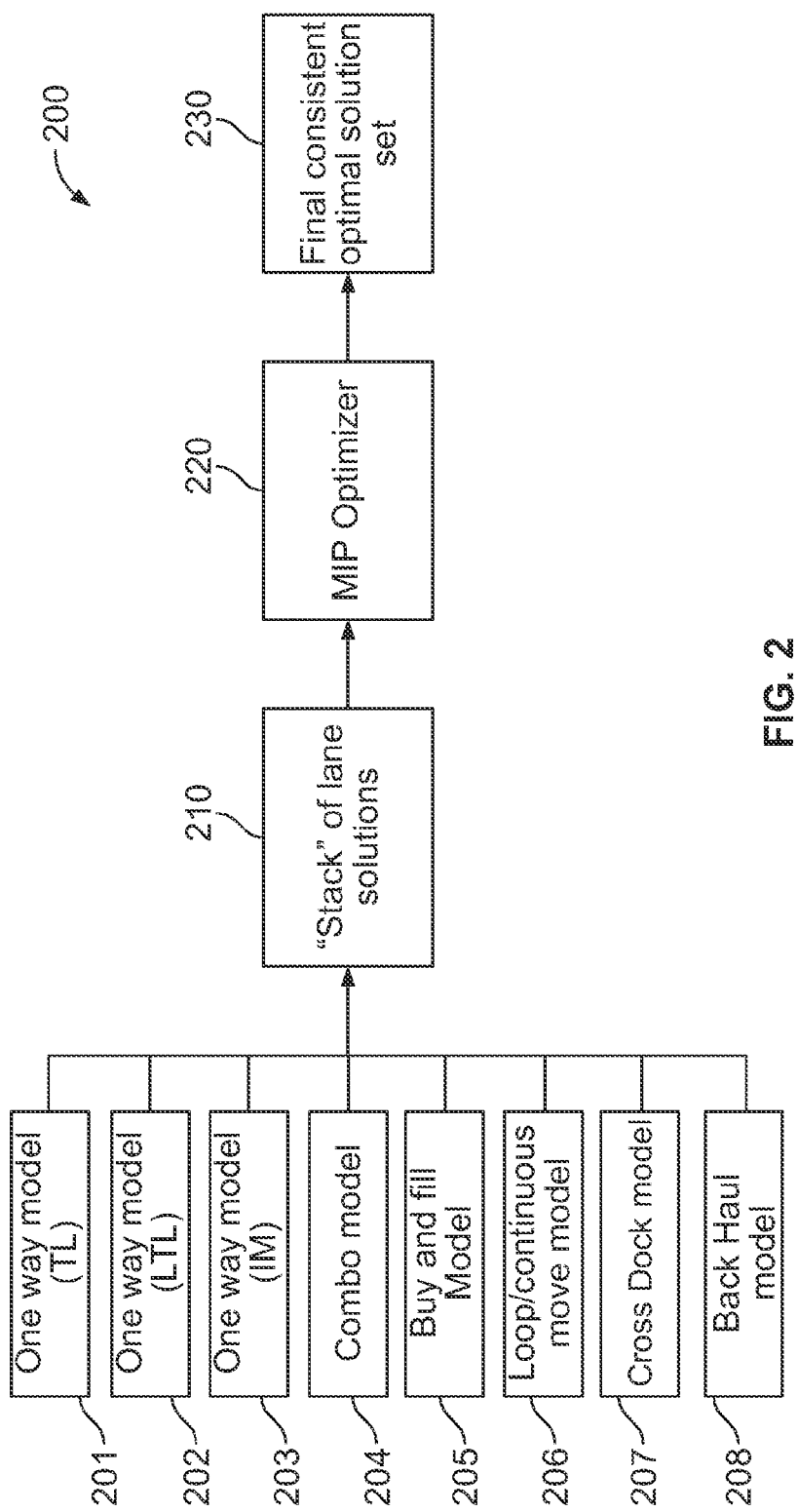
FIG. 2 illustrates further detail of the optimization process performed by the modeling processor of FIG. 1.

FIG. 2 illustrates further detail of the optimization process performed by the modeling processor 160 of FIG. 1. In FIG. 2, several individual models 210-208 are used to form a stack of lane solutions 210 which are then passed to a Mixed Integer Program (MIP) Optimizer 220 to determine the optimal solution set. Then, a final consistent optimal solution set 230 is output.

More specifically, the individual models 201-208 include a one way Truck Load (TL) model 201, a one way Less Than Truckload (LTL) model 202, a one way Inter Modal (IM) model 203, a combo model 204, a buy and fill moel 205, a loop/continuous move model 206, a cross dock model 207, and a backhaul model 208 each of which is further detailed below.

First, the one way model Truck Load (TL) model 201 creates individual solutions for each lane in a list and order frequency is flexed/altered to maximize revenue per truck. In a preferred embodiment, the following formula is employed to find the optimum frequency:

OptFreq=max(min(total monthly wt/max wt per truck, total monthly cube/max cube per truck,total monthly pallets/max cube per pallet),MinFreq)

MinFreq=min(historical freq,1/max time between orders)

max time between orders=preset value based on inventory requirements

Where monthly weight is the total weight on the lane over all items. Max weight is based on type of truck. Monthly cube is total cubic feet in volume required for the month over all items. Monthly pallets is the total pallets required over all items for a month. Trucks are generally measured in three dimensions—weight, cube, and pallet—each with its own max capacity. A truck may run out of capacity due to any one of these depending on what is being hauled.

Alternatively, the model may be controlled to ignore one or two of weight, cube, or pallets, but preferably all three are used where available in order to better confirm a lane solution.

The max time between orders is a constraint set by the user, for example, to make sure that minimum inventory targets are maintained. MinFreq is the minimum frequency of orders and is the lesser of the historical frequency or orders or the inverse of the max time between orders as set by the user.

The next model is the one way LTL model 202. In the one way LTL model 202, individual solutions are created for each lane and placed in a list. The individual solutions use a less-than-truckload mode of transportation. The order frequency is preferably not flexed or altered from the current information. Additionally, weight, cube, and pallets per load are based on the recent historical purchase orders. Additionally, lanes are restricted based on LTL operational constraints set by the user. Some constraints for LTL include: max weight, max cube, and max pallets. If the weight, cube or pallets are larger than the max, then the load is TL (truckload) and typically cannot be moved LTL because LTL carrier would typically refuse to take it.

The next model is the one way intermodal model 203. In the one way intermodal model, 203, individual solutions are created for each lane that will use an inter-modal method of transportation, such as both trucking and rail, for example. Other modes include shipping, parcel and backhaul (BH).

With regard to backhaul, a company that owns its own fleet may have trucks that are normally routed to a remote location to make a drop off or delivery, but are then forced to return empty to the distribution center from the drop off point. However, these trucks may be used to make an inbound pick-up and delivery at very low cost since they had to travel in proximity anyway to return to the DC.

That is, instead of the truck returning to the distribution center or manufacturer empty, the truck may be used as a carrier back. The inclusion of possible backhaul lanes in the model may be accomplished by its own mode, called backhaul mode, or it may be implemented in other tools. For example, the combo model may combine lanes and used backhaul lanes as an option. In one or more embodiments of the description of models above, the trucks/equipment are owned by the distributor so as to take advantage of the backhaul opportunities.

Additionally, with regard to the "parcel" mode, the parcel mode takes into account the shipping cost of moving parcel-size and weight items using a common carrier such as UPS or the US or international mail.

In the one way intermodal model 203, order frequency is flexed using the same formula as in the one way truckload model 201. Additionally, lanes are restricted based on inter-modal operational constraints set by the user, for example, weight, cube, and pallet, as well as also temp, length of lane, and origin and destination.

The next model is the combo model 204. In the combo model 204, individual solutions are created where each solution includes two or more lanes. More specifically, the lanes of a solution may be identified based on pick-up proximity, drop-off proximity, temperature protection, revenue generated, or restrictions based on one or more of: 1) out of route miles, 2) number of picks, 3) number of drops, or 4) number of stops. All lanes in the solution are preferably set to have the same OptFreq (that is, all lanes are picked up together each time. However, in alternatives this may be varied. The formula for determining OptFreq is preferably the same formula employed by the one way truckload model 201.

The next model is the buy and fill model 205. The buy and fill model 205 creates individual solutions where each solution includes 2 lanes: the buy lane and the filler lane. More specifically, the lanes of a solution may be identified based on pick-up proximity, drop-off proximity, temperature protection, revenue generated, or restrictions based on one or more of: 1) out of route miles, 2) number of picks, 3) number of drops, or 4) number of stops. The buy and fill model 205 is typically only used for some orders and the filler lane is not always transported with the buy lane. Preferably the filler lane is flexed in order to sufficiently fill a truck. However, the buy lane is typically not flexed and the frequency is set to the historical frequency. For example, the filler lane may be four purchase orders per month, each taking up 90% of a truck while the buy lane may be one load per month taking up 10% of a truck. Once per month the two lanes may be shipped together, but 3 times per month the filler may be shipped all alone.

The next model is the loop/continuous move model 206. In the loop/continuous move model 206, individual solutions are created where each solution includes two or more lanes. More specifically, the lanes of a solution may be identified based on pick-up proximity, drop-off proximity, temperature protection, revenue generated, or restrictions based on one or more of: 1) out of route miles, and 2) number of stops. Frequency of delivery is flexed. The loop/continuous move model 206 differs from the combo model 204 in that loads are transported in sequence in the loop/continuous move model 206 rather than at the same time in the combo model 204.

The next model is the cross dock model 207. The cross dock model 207 creates individual solutions where each solution includes multiple lanes with consolidation and/or deconsolidation points such as provided by a cross dock. In the cross dock model 207 order frequency is flexed. Additionally, many lanes can be covered in a single solution. That is, one cross dock solution may be the optimal way to move the flow for several lanes. This is different from one ways where one one way solution only involves one lanes. One cross dock solution will typically always involve multiple lanes.

The final model is the backhaul model 208. As discussed above with regard to the intermodal model 203, a company that owns its own fleet may have trucks that are normally routed to a remote location to make a drop off or delivery, but are then forced to return empty to the distribution center from the drop off point. However, these trucks may be used to make an inbound pick-up and delivery at very low cost since they had to travel in proximity anyway to return to the DC.

That is, instead of the truck returning to the distribution center or manufacturer empty, the truck may be used as a carrier back. The inclusion of possible backhaul lanes in the model may be accomplished by its own model, called backhaul model, or it may be implemented in other tools. In one or more embodiments of the description of models above, the trucks/equipment are owned by the distributor so as to take advantage of the backhaul opportunities.

One aspect of the present invention is the recognition that there is a considerable difference between inbound logistics and outbound logistics. For example, one or more embodiments of the present invention provide an achievable strategy for inbound logistics organizations to elevate freight savings by 20-30%, through a collaborative, technology-enabled approach to logistics and purchasing planning. More than a new set of tactics, the approach implements a paradigm shift, away from a model that tends to mimic an outbound logistics program, and towards one that extracts full value from the advantages of inbound freight control.

One important difference is, unlike the outbound side, Inbound Freight Management has a revenue component, originating in the freight allowances on products provided by the shipper. If the logistics team can source carriers at a rate lower than the allowances, Inbound Logistics can become a profit center, earning income on lanes taken over from shippers. Because of this, in the inbound world, load profitability and total landed cost (in addition to service level) are important metrics requiring management. Freight cost reduction, the traditional barometer of logistics performance, tells only half the story. Moreover, the story must be told at an item level. Logistics income is impacted by the viability of SKU-level freight allowances in reflecting true manufacturer freight costs, and also by the mix of items on the truck. Item-level visibility is a valuable asset while managing inbound freight and pursuing lowest total landed cost.

Another important difference is that Inbound freight programs can largely be selective in the lanes they convert to their management. Increased profitability may be as much a question of what lanes an organization manages—or choose to cease managing—as how well they manage them. Effective monitoring of lane profitability enables Inbound Logistics departments to build the network they want, rather than manage the network they are given. In practice, organizations struggle in matching up daily load planning to the network planning exercise that persuaded them to take over management of a freight lane. Proper synchronicity between these processes is important to deliver predictability of results in Inbound Freight.

Another difference is that Inbound Freight planners work in the same company as the buyers placing the orders—and consequently can vary or flex the orders in terms of amount and frequency so as to maximize logistics efficiency. This is an opportunity for collaboration between Purchasing and Logistics, to provide ordering guidelines that create routing efficiencies. Equipment utilization is the largest single driver of freight cost per case, and the largest single driver of equipment utilization is the buying pattern: how much is ordered, when it is ordered, and with what frequency. Outbound shippers will attempt to influence purchasing behaviors through order volume price breaks, and in some instances vendor managed inventory programs. However, Inbound Logistics has the far greater opportunity for true, broad-based collaboration with Purchasing.

The differences between inbound logistics and the typical logistics program outlined above are very significant. Inbound and Outbound logistics are, truly, entirely different business functions. Unfortunately, technology providers have largely ignored the differences between them. Transportation Management System (TMS) solutions purchased for inbound freight management are precisely the same systems purchased for outbound freight, and implemented nearly identically. Little or no consideration has been given to load profitability or per case analysis, and item-level visibility is rare.

No prior art systems address the selective nature of the freight under management, the need to build synchronicity between network planning and load planning, and none expose or manage the opportunities to collaborate with Purchasing. Put simply, in commercial transportation management systems, the world is seen through the lens of a manufacturer shipping outbound product. This is the arena in which the products have been developed and tested, and it represents the largest market segment their sales forces pursue. As a result, inbound logistics personnel are forced to fit within the mold of outbound transportation management processes, or struggle to change or augment those capabilities to meet their objectives.

When it comes to collaboration between Purchasing and Logistics, without the right tools, most supply chain organizations find limits to what they can achieve. Absent a well-defined and technology-enabled platform for partnership, these highly inter-dependent functions remain at arm's length, communicating without collaborating, bound to different and often conflicting incentives.

When it comes to locating and quantifying the potential savings by integrating inbound logistics with purchasing, one of the differentiating aspects of inbound freight matters above all others: control of the freight resides in the same organization as control of the order. The potential power of this is easy to understand, in theory. After all, if logistics personnel placed the orders, every truck would be 100% utilized, every time (or better yet, running on rail). Back in the real world of changing customer demand, short product shelf life, inventory carrying costs, and storage capacity constraints, a separate purchasing and inventory control function is required.

However, there is a middle ground where a deeper logistics savings consideration can become a greater part of purchasing operations. Few would disagree that if purchase orders are aligned to more consistently fill trucks to capacity and minimize miles driven, logistics costs will improve. However, purchasing and replenishment systems that include freight cost consideration do so at only the most rudimentary levels, if at all.

If a supply chain leader asks the question: "What is the absolute minimum total landed cost that can be achieved by the combined order-to-delivery process, without putting customers at risk?" most Purchasing and Logistics teams do not have the ability to answer. Instead, current systems rely on the following three assumptions: Assumption #1: Purchasing needs no further guidance. Our Buyers already try to order in full truckloads wherever they can; Assumption #2: Logistics' requests for order pattern changes will generally be infeasible, as they do not consider customer demand; and Assumption #3: Since logistics savings are based on freight consolidation, every attempt to save in freight costs will come at the expense of inventory levels. These assumptions come to rule the relationship between Purchasing and Logistics. As is often the case with deeply embedded assumptions, they are self-fulfilling: they quash any momentum to fully collaborate in driving savings, thereby limiting logistics to offer only the most rudimentary and uninformed purchasing guidelines, which only appear to further prove out the assumptions. The guidelines, born in the manual spreadsheet manipulations of a logistics engineer, tend only to increase order sizes and reduce inventory turns (putting them at immediately odds with Purchasing performance metrics), and often ask for alignment of orders in ways that will risk stocking out of a product. In practice, a few vendors may be found that both sides agree can be regularly scheduled to deliver simultaneously, but even these requests from logistics are frequently ignored in favor of daily decision-making on the part of the buyer. As embedded as it is, this is a cycle of behavior that can only be broken with a clear measure of the value of breaking it.

Figure 3:
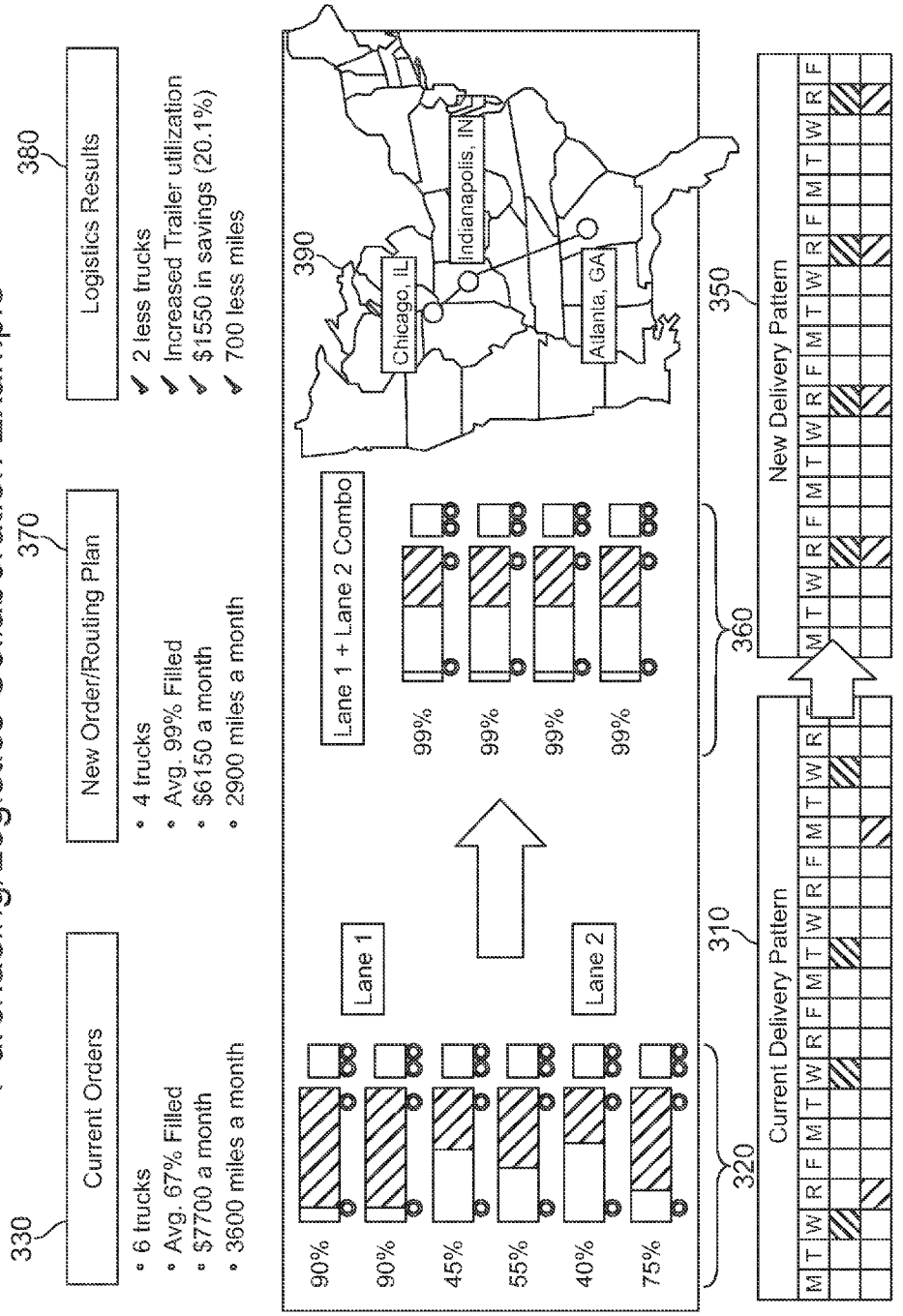
FIG. 3 illustrates how the present system for logistics optimization using lane order pattern flexing may provide a savings increase of 20-30%.

FIG. 3 illustrates how the present system for logistics optimization 100 using lane order pattern flexing may provide a savings increase of 20-30%. FIG. 3 includes a current delivery pattern 310, a current shipment truck fill 320 and a current order summary 330. FIG. 3 also illustrates a new delivery pattern 350, a new shipment truck fill 360, and a new order summary 370, as well as a logistic results summary 380 and a route map 390. Additionally, the items carried by the trucks are differentiated into product A and B based on their shading. Further, although only two items and a single route are shown, FIG. 3 is meant to be a simplified example of the present system for logistics optimization 100.

Turning to FIG. 3, the current delivery pattern 310 illustrates that the company receives in a 20-day period two deliveries of product A and four deliveries of product B. The frequency and days of the weeks of each delivery are shown. As shown, none of the six total deliveries take place on the same day.

Turning to the current shipment truck fill 320, is it shown that the two deliveries of product A take place using a truck that is 90% filled, while the deliveries of product B take place using a truck that is anywhere from 45% to 75% filled. Such a situation may occur often in the real world where product B's usage over the month or the demand for product B over the month is non-uniform.

The current order summary 330 reveals that the current logistics process to deliver items A and B uses 6 trucks which are on average 67% filled and 3600 total miles are driven per month. The cost for these trucks to make the deliveries is $7700 per month in this example—although this number may vary depending, for example, on route, temperature protection, and truck size.

In other words, the left side of FIG. 3 represents a sample current state: freight running on two lanes on a monthly basis, both dropping off at the same facility. One product is ordered in near full truckload quantities, twice a month. The other is ordered in smaller quantities, required at least four times a month. Assuming that no other shipments exist that could fill out the trucks on the second lane, both Purchasing and Logistics would typically claim comfort with the current state. The buyer is filling equipment where they can, and only ordering smaller quantities where they must.

On the Logistics side, the prior art TMS route optimization software leaves the full truckloads alone (no TMS system on the market ever seeks to break a truckload shipment), and sees no way to improve upon the second lane. Logistics engineers may ask Purchasing to place larger orders on Lane 2 for product B, only to be told that inventory turns cannot be increased without risk of stocking out.

Turning to the new delivery pattern 350, it shows a new delivery pattern in which there are only four deliveries during a 20 day period and each delivery includes a delivery of both Product A and Product B. Turning to the new shipment truck fill 360, it is seen that each of the new shipments is composed of about 40% of Product A and about 60% of Product B.

Thus, the two approximately full truckload shipments of Product A have been broken into four shipments of partial truckload and the remainder of each shipment is filled with Product B. As shown in the new order summary 370, the new plan only involves four trucks rather than 6, and each of the trucks is about 99% filled. Further, the monthly cost is about $6150 and the miles traveled is about 2900.

The improvement of the new delivery pattern over the old delivery pattern is summarized in the logistics results summary 380. More specifically, two fewer trucks are used, the trailers of the trucks that are used are much more fully utilized—up to about 99% from 67%, there is a $1500 per month savings (20.1%) and 700 fewer miles are traveled in all.

FIG. 4 illustrates the example of FIG. 3 at an inventory rather than a lane level. FIG. 4 shows the current replenishment pattern 410, current order 420, and current order summary 430, as well as a new replenishment pattern 450, new order 460, new order summary 470, purchasing results 480 and route map 490.

As shown in FIG. 4, the current order replenishment plan 410 shows the current order 420 is delivered on six different days and that the delivery amount of Product B varies. As shown in the current order summary 430, the current order provides six total inventory turns and provides an average of 21 days on hand of Product A.

Turning now to the new order, as shown in the new replenishment plan 450, deliveries are down to four days and both Product and Product B are delivered together. Further, a smaller amount of Product A is delivered in each of the four shipments and the deliveries of Product B are set to an average number, as shown in the new order 460. As shown in the new order summary, the new order 460 represents eight total inventory turns and reduces Product A to 17.25 days on hand. Finally, as shown in the purchasing results, the new order 460 has increased the overall turns by 33%, reduced the inventory of Product A by 18, and made the order pattern of Product B more predictable.

In other words, by scaling down the truckload orders to free up enough space to absorb the shipments on the second lane, a new picture emerges: four full multi-stop truckloads a month. This concept goes against prior art TMS systems which would not break up the shipments of Item A because they are approximately a full truckload. The results of the example of FIG. 3 include: 20% reduction in freight cost, 60% increase in overall inventory turns, 33% reduction in deliveries hitting the dock, and 19% reduction in miles driven.

These results are very beneficial, and not just in the savings they deliver. Importantly, they protect and even improve upon key purchasing metrics as well. Add to this the operations benefit of reduced dock congestion, and a significant carbon footprint improvement, and this example begins to speak loudly for a new way of thinking about logistics ability to impact supply chain objectives. The example shatters the assumption that logistics savings only comes at the expense of inventory risk. In fact, all three assumptions in the prior section are challenged in this one example, for one very counterintuitive reason: scaling down orders can improve logistics efficiency.

The present logistics optimization system considers the full range of possible adjustments to order size, frequency, and timing to exponentially increase the possibilities to mine for freight consolidation. Unlike the old method of route optimization alone that waits for matching shipments, combined optimization of ordering and routing essentially lets the user match shipments as desired.

The present logistics optimization system may expose and assess the universe of permutations of ordering and routing. When the present optimization algorithms are employed to uncover these "win-win" scenarios, the results can be surprising in scale. Assessments of inbound freight networks large and small have shown that solutions such as the example above are so prevalent in a network that the network-wide savings of 20-30% is accompanied by an average total inventory reduction of 1.5%. This inventory reduction is a net number, inclusive of solutions that scale orders up (within reasonable constraints, such as maximums of 3-4 weeks inventory) or scale orders down. This means that the impact of scaled down orders is outstripping the impact of scaling them up. While these results can vary from one inbound network to the next, most organizations can minimally expect to keep inventory levels flat while still achieving significant savings.

The logistics changes found by the present logistics system may be implemented without significant process or systems upheaval. In a preferred system, buyers still place the orders, using existing systems and logistics planners still plan the routes, using existing TMS capabilities. Collaboration preferably does not require any change to the fundamental responsibilities or personnel makeup of these teams. It also does not require a disruption in the flow of orders from purchasing to transportation systems. Instead, implementation is building new connective tissue between purchasing and logistics processes, based on up-front planning and a closed feedback loop for compliance monitoring and corrective action. The connective tissue is found in specific new activities and technologies at three junctures in the order-to-delivery sequence: prior to order, prior to tender, and post-delivery.

Figure 5:
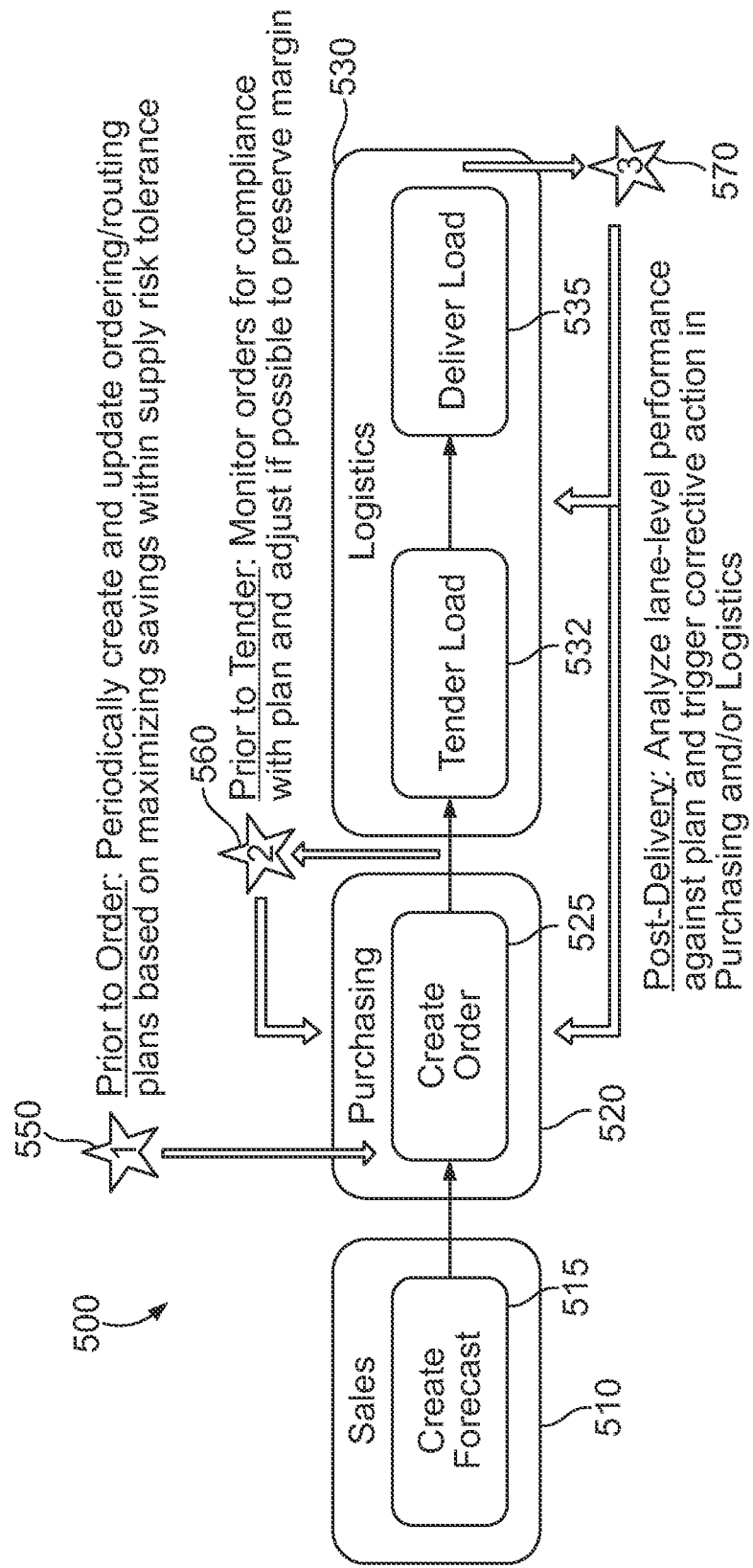
FIG. 5 illustrates the addition of the present system for logistics optimization 100 into the logistics process.

FIG. 5 illustrates the addition of the present system for logistics optimization 100 into the logistics process 500. As shown in FIG. 5, the logistics process 500 includes sales 510, purchasing 520, and logistics 530. Sales 510 includes the function of creating a forecast 515 of inventory or products needed. Purchasing 520 includes the function of creating an order 525 to obtain the desired inventory or products. Logistics 530 includes the functions of tendering the load 532 and delivering the load 535. Additionally, one or more aspects of the present invention may interact with the logistics process 500 at one or more of prior to order 550, prior to tender 560, and post-delivery 570.

With regard to the interaction of the present logistics system 100 with the logistics process prior to order 550, the most expedient way to adjust order patterns and set routing guidelines is to do so with a planning-based approach, pro-actively, before the orders are placed. This periodic planning process is performed on the side of the existing buying and freight execution sequence. It is certainly possible to implement a more invasive and exacting process, generating replenishment orders systematically that consider forecast, inventory, and logistics impact. However, if the intention is to capture the bulk of these savings with the minimum of systems and process turnover (as is likely), a planning-based approach is advisable.

In a planning-based approach, a technology solution is leveraged, likely by a Logistics Engineering person or team, to periodically examine demand requirements, based on recent order history, updated with any seasonal or other demand forecasting information. This process might be run once a week, once a month, once a quarter—the frequency depends on network volatility, and how tightly the organization wants to manage the ordering guidelines to support the highest profitability. The logistics optimization system accepts order history, forecast information, and carrier rate information, and uses optimization technology as described above to identify the most profitable ordering and routing scenarios available for each freight lane.

Constraints may be applied at a global, supplier, and item level to mark the boundaries of feasibility. Some constraints likely to be required include (but are not limited to) equipment type, limitations on products that cannot be consolidated, pallet space, and on the order pattern side, shelf-life restrictions, and the degree to which order frequency can be adjusted.

The output of this process is not orders or loads. It is a set of guidelines on how to purchase and route product: recommendations on order size, frequency, and timing, to set up ideal consolidation solutions. The optimization technology accounts for the opportunities available to your network, by leveraging multiple models as described above. This may further include backhaul opportunities and fleet utilization, continuous moves, and cross-dock or pooling scenarios.

A process is then implemented to review, approve, and "publish" these guidelines. This involves software-supported workflow to track agreement from both Logistics and Purchasing, and signoff on the savings and inventory impact for each solution. Once published, the guidelines are fed to purchasing, for adoption during the replenishment process. Most robust purchasing systems may accept the types of parameters required, but some buying organizations may be more comfortable using them in a more manual fashion. In addition, the profitability expectations of each solution are stored, as targets to be measured against later in the process.

The present proactive planning process is typically not resource-intensive for each implementation. The first time it is run, the entire network is under review, and the list of solutions to assess quite long. From that point forward, the full network is preferably included in the optimization process, but only the resulting solutions that are new or changed need enter into the review and approval process. This is typically a manageable list, on the order of 3 to 5% of total freight lanes on a monthly basis, even in large-scale networks.

In fact, the overall resource impact of this approach can be very favorable. Today, many organizations leverage optimization technology within their selected TMS solution to select routing for freight just prior to load tender. The simpler solutions that emerge from this process can largely be tendered with little oversight. However, freight planners often find that they need to review all suggested consolidations that emerge from these tools, to ensure feasibility. Despite the promise of automation, too many business exceptions exist to permit this sort of hands-off freight routing. In contrast, an up-front planning approach seeks to smooth out and standardize purchase orders, such that route determination more often follows a plan that has already been vetted. In an environment of collaboration between Purchasing and Logistics, daily exception management at the point of freight execution is significantly reduced, in favor of a more efficient, proactive planning regimen. Before moving on, it should be mentioned that the planning function can and should be leveraged to examine freight that is not yet under management, where a freight allowance is known (or a true freight cost has been broken out). Completely separate from the 20-30% savings improvement stated earlier is the added revenue achievable by finding new lanes that fit with the buyer's network. In many instances these are lanes previously ignored as unprofitable, when order pattern changes were not considered.

With regard to the interaction of the present logistics system 100 with the logistics process prior to tender 560, it is recognized that lasting success in any collaboration activity requires more than just a joint planning function. A closed feedback loop is desirable to monitor compliance to plan, and support timely corrective action between both teams. Since this solution involves building better order patterns up front, it is possible within this model to recapture load profitability before it is even lost (i.e. shipped).

This may be done by leveraging exception management technology to highlight non-compliant purchase orders as soon as they are created, and facilitate communication between load planners and buyers to revise the order before it is built into a shipment and tendered. There is no need for this process to interrupt the automated flow of orders to a TMS system, as long as the compliance alerts are acted upon before the tender occurs. This may often be accomplished through simple process timing (checking compliance alerts prior to running the load creation process in the TMS).

Not all instances of non-compliance may require action. Some may arise from unanticipated inventory needs. Some may be close enough to target thresholds that a decision can be made to allow the order through. Some may simply highlight that a plan needs to be changed for future orders to reflect new realities. To facilitate this decision process, it may be important that the exact reason for non-compliance and the profitability impact (dollar variance from target) is available with the compliance exception alert. It is also desirable to log reason codes whenever a non-compliant order is allowed through, to facilitate summary reporting of process effectiveness.

This "soft checkpoint" (soft, meaning that orders are not automatically adjusted to be compliant), along with the periodic re-assessment of plans discussed earlier, enables order patterns to be changed in a way that is still responsive to a dynamic supply network. As valid exceptions occur, they are allowed through, but measured, and if representative of the new operating rules, used to trigger updates to the plans.

With regard to the interaction of the present logistics system 100 with the logistics process post delivery 570, the final step in the closed-loop process is trend reporting at a lane level, and root cause analysis on the margin of delivered loads. A host of factors may reduce load profitability from the targets set during planning, including freight allowance changes, order size fluctuations, and product mix on the revenue side, and secondary carrier usage, fuel rate changes, and one of a host of possible unplanned accessorial charges in the load cost.

In depth visibility and drilldown root-cause analysis into these drivers is desirable for any inbound freight management team (even those not taking this approach in full), as well as a tracked workflow process to ensure that steps are taken to prevent or offset margin decay over the life of a freight lane. It is noted that commercial TMS solutions largely neglect freight margin analysis. A few may carry PO-level revenue through, but cannot measure the impact of item mix and lack the ability to drive to SKU-level analysis. Without the capability to perform detailed root cause analysis into both revenue and cost movement, inbound freight management teams may struggle to maintain a rigorous focus on sustaining savings.

Figure 6:
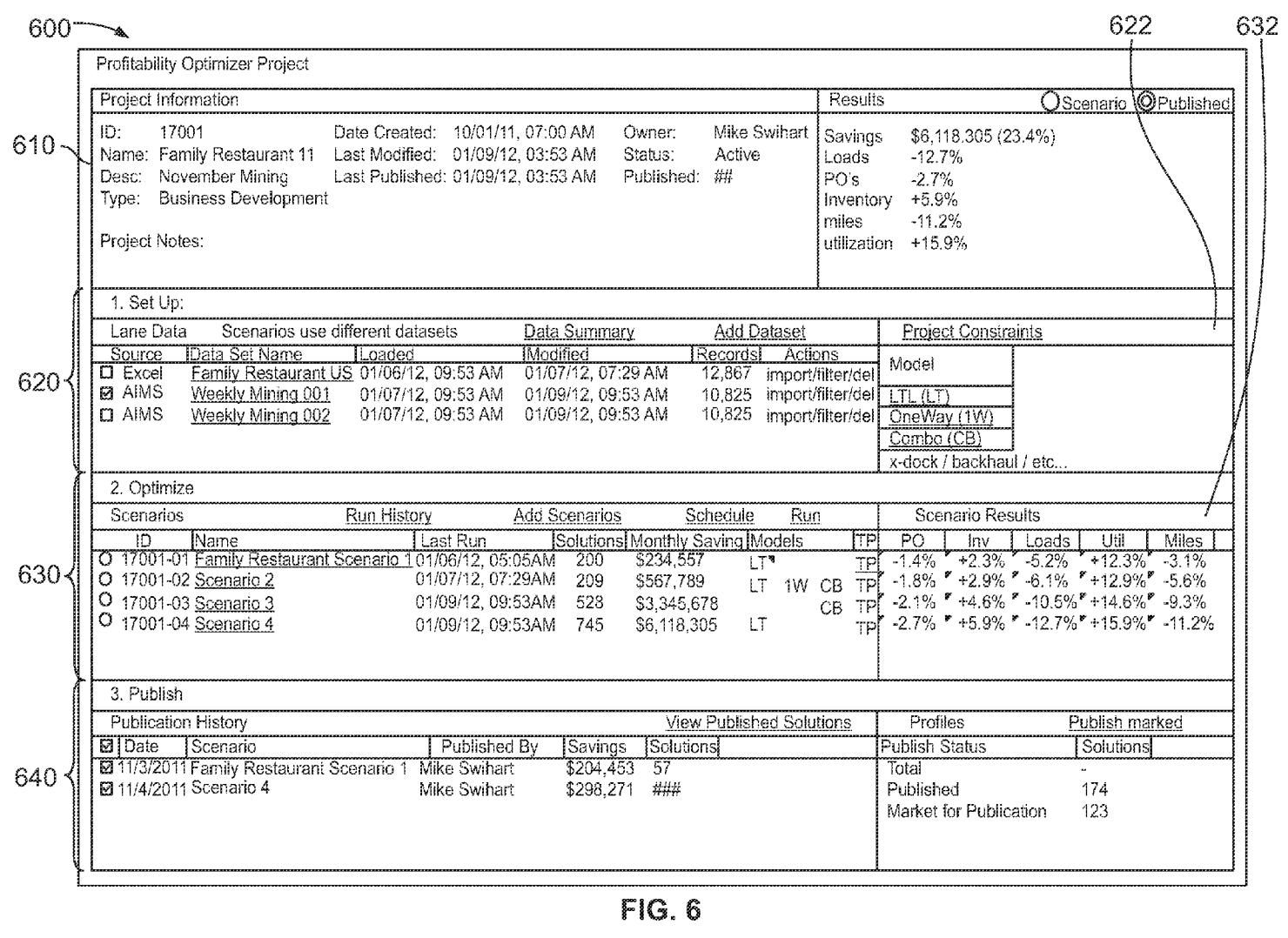

FIG. 6 illustrates a screen shot 600 of an Inbound Transport Management (ITM) system according to an embodiment of the present invention. As shown in FIG. 6, the screenshot 600 includes project information 610, such as a name and description, the dates created, modified, and published, and any status.

The screenshot 600 also shows a set up section 620 including data for several lanes. Each lane preferably includes information about the type of data, the data set name, the date it was loaded, the data it may have been modified, and the number of records. A list of at least some of the project constraints is also shown at 622.

The screenshot 600 also shows an optimize section 630 including several scenarios for consideration for implementation. Each scenario is preferably associated with an ID, a name, a run history, the number of solutions, the monthly savings, and the schedule. Additionally, a summary of scenario results is shown at 632.

The screenshot 600 also shows a publish section 640 including a listing of scenarios that have been published. Each published scenario is preferably associated with a date, name, person publishing, savings, and solutions.

FIG. 7 illustrates a screenshot 700 of the ITM lane import criteria screen. As mentioned above with regard to FIG. 1, recent historical lane data is imported into the ITM system. As shown in FIG. 7, the recent historical data includes lane and vendor numbers, vendor name, ship-from city, freight allowance, weight, and cube, monthly frequency, and several other factors.

Additionally, FIG. 7 illustrates the "grade" column. The grade column represents a grade that is manually by a reviewer to indicate lanes that are more profitable than another, for example, for review and discussion of taking over such lanes. Alternatively, the grade may be assigned based on profitability and risk of execution of the lane or solution.

FIG. 8 illustrates a screenshot 800 of the constraints preferably entered for the implementation of the combo model 204 of FIG. 2. As shown in the screen shot 800, the constraints preferably include load size constraints, lane constraints, financial constraints, cost settings, flexing constraints, and solution constraints. Similar constraints may be entered for each of the models 201-207 of FIG. 2.

FIG. 9 illustrates a screenshot 900 of an ITM scenario analysis screen providing a view of optimization solutions with the ability to lock, exclude, and mark solutions for publication. The screenshot 900 includes set up information 910 including lane data and scenario constraints and overrides. The screenshot 900 also includes optimize information 920 identifying each model employed, a description of the model, any constraints employed, the cost savings, and the model results. The screen shot 900 also includes scenario solution detail information 930 including status and information about the solutions.

Figure 10:
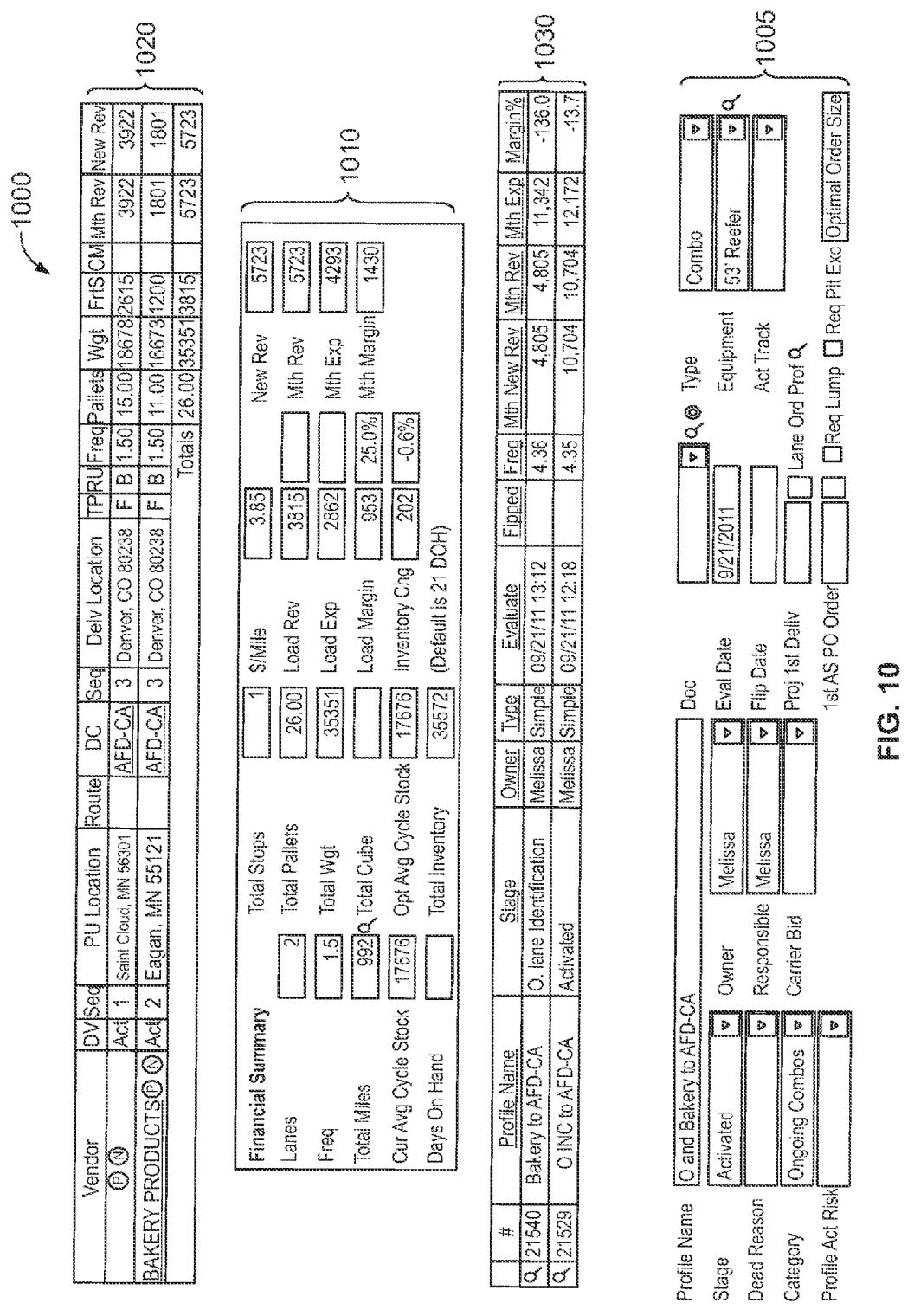

FIG. 10 illustrates a screenshot 1000 of a lane profiles tool for visualization and what-if analysis of lane optimization and order flexing results. From the screenshot of FIG. 10, the user may view and modify drivers financial, operations, and inventory impact of one-way, consolidation (combo), cross-dock, backhaul solutions. The user may also view related solutions and access lane and item information on recent sales, purchase, and inventory. The user may also manage workflow in activating solution.

Further, as shown in the screenshot 1000 of FIG. 10, it includes a lane identification 1005 and a financial and operations summary 1010 that includes new order frequency, size, and estimated revenue, cost, margin, and inventory impact. The screenshot 1000 also shows a list of lanes included in the solution profile 1020 with summary statistics related to purchase patterns and freight financials. The screenshot 1000 also shows a list 1030 of other profiled that include lanes in this profile.

FIG. 11 illustrates a screenshot 1100 of a lane analysis tool used to examine shipment, purchase order, inventory, and sales information summarized to a lane level to support order and route pattern determination. Additionally, the screenshot 1100 shows a lane-level summarization 1110 of order/shipment information and product sales, by min, max, average, etc. across recent history. Further, the screenshot 1100 shows recent purchase order activity 1120.

Figure 12:
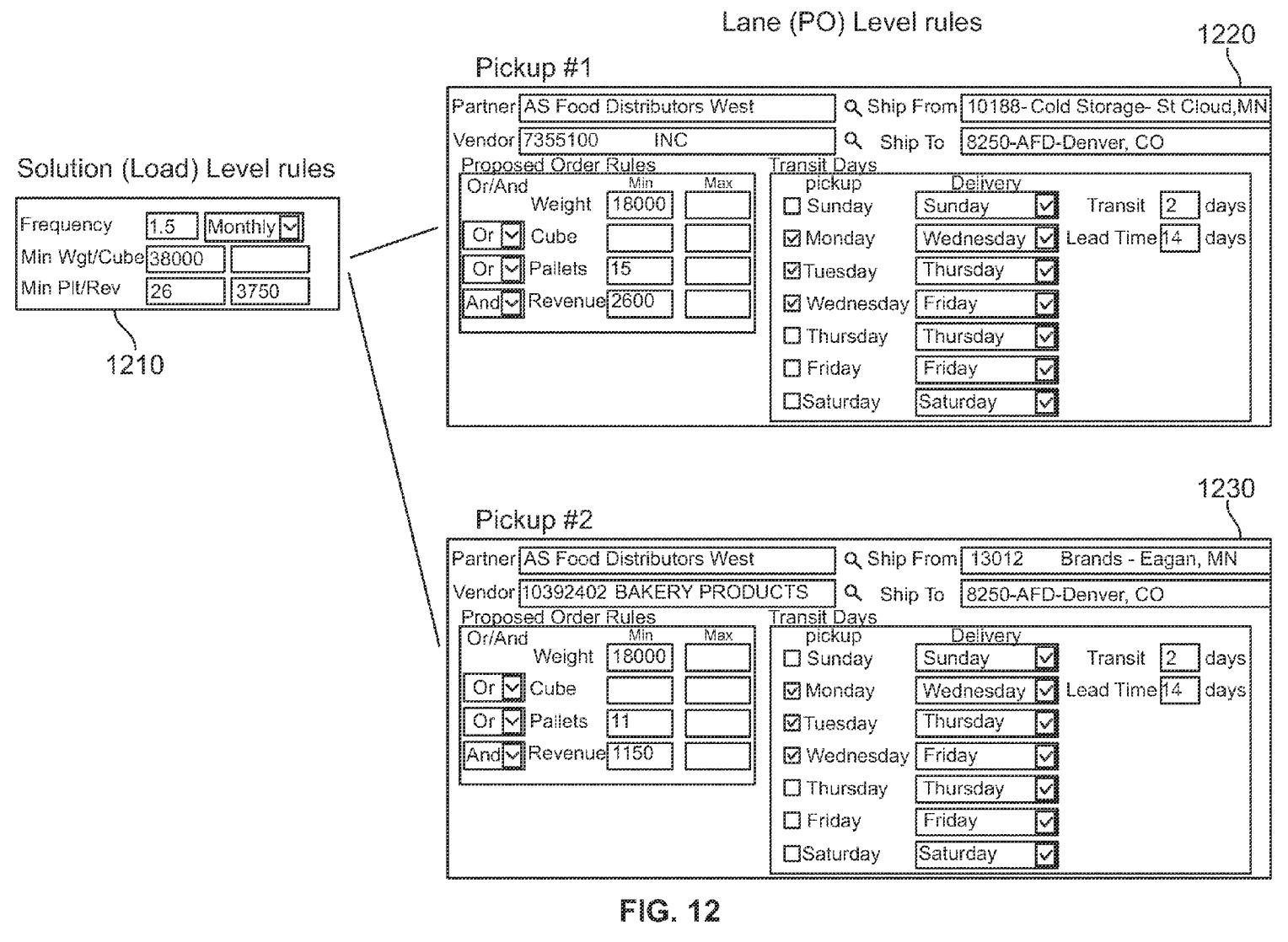

FIG. 12 illustrates a screenshot of lane order profiles which include purchasing guidelines for communication to purchasing systems or processes. The purchasing guidelines may include order size, timing, and frequency rules for one or more lanes in a routing solution. The screenshot includes solution (load) level rules 1210, and lane (PO) level rules for Pickup #1 1220 and Pickup #2 1230.

FIG. 13 illustrates a screenshot 1300 of the compliance detail. The compliance detail displays expected and actual purchase order size, timing, frequency, revenue, cost, and highlights elements of non-compliance with order rules, to enable logistics or purchasing personnel to assess the financial impact and consider correcting orders prior to load tender.

Figure 14:
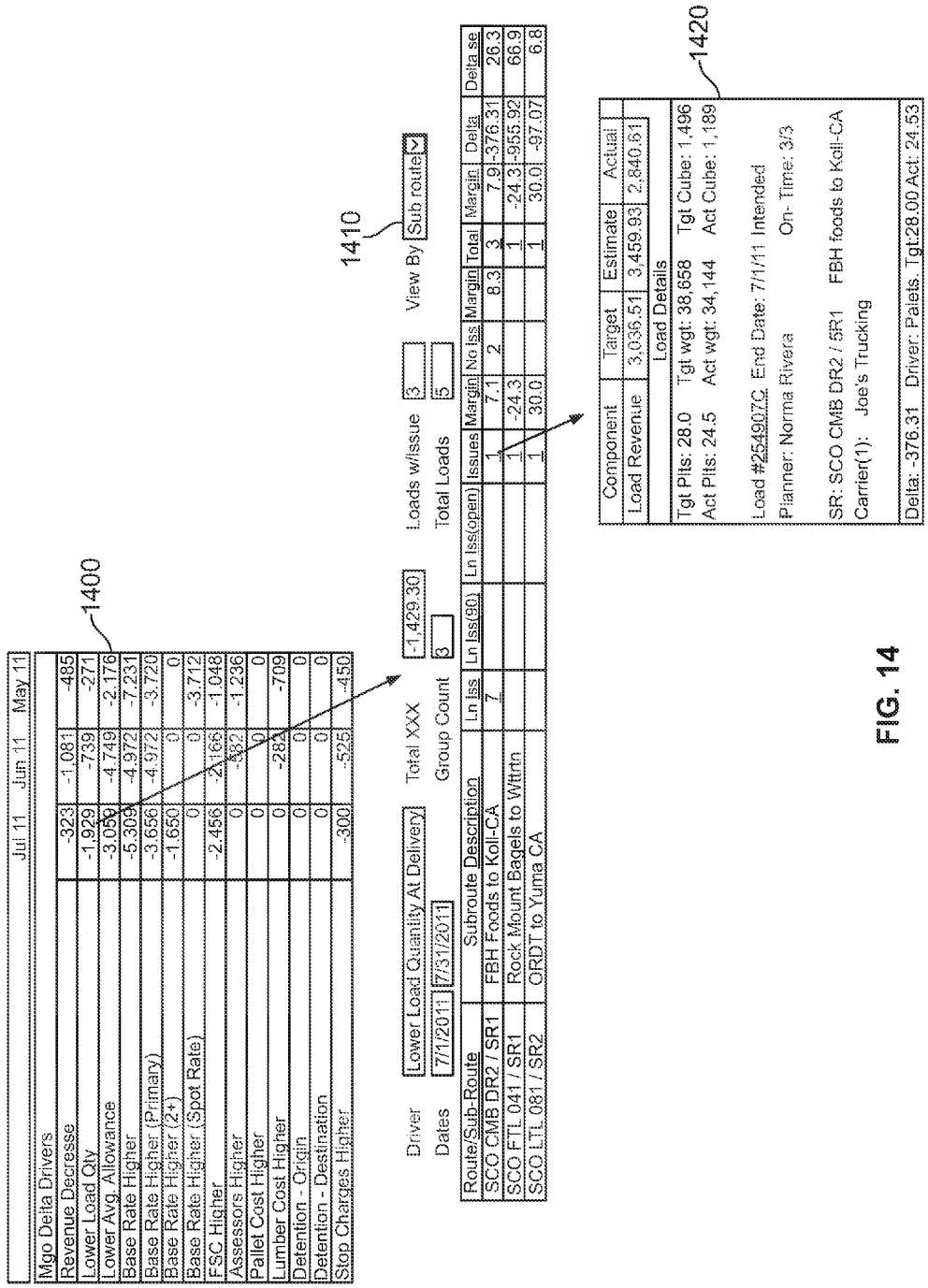
FIG. 14 illustrates a screenshot of the gross margin dashboard.

FIG. 14 illustrates a screenshot 1400 of the gross margin dashboard. The gross margin dashboard enables root cause analysis of margin shortfalls against target, showing performance against target, over time, by revenue and cost component/driver. It also enables view of only negative impact components, to identify improvement opportunities whether or not the load met margin targets at an overall level. Further, the gross margin dashboard allows drill down into lane and shipment level to examine root cause and allows the user to filter by "lane issue", a workflow mechanism for tracking resolution of issues found.

As shown in FIG. 14, the gross margin dashboard 1400 allows a user to click on an entry such as the July 11 "Lower Load Qty" entry. A summary screen 1410 detailing those loads having lower load quantity is then displayed. Additionally, the summary screen 1410 allows a user to click on a specific load to display a detail screen 1430 displaying details for that particular load.

Figure 15:
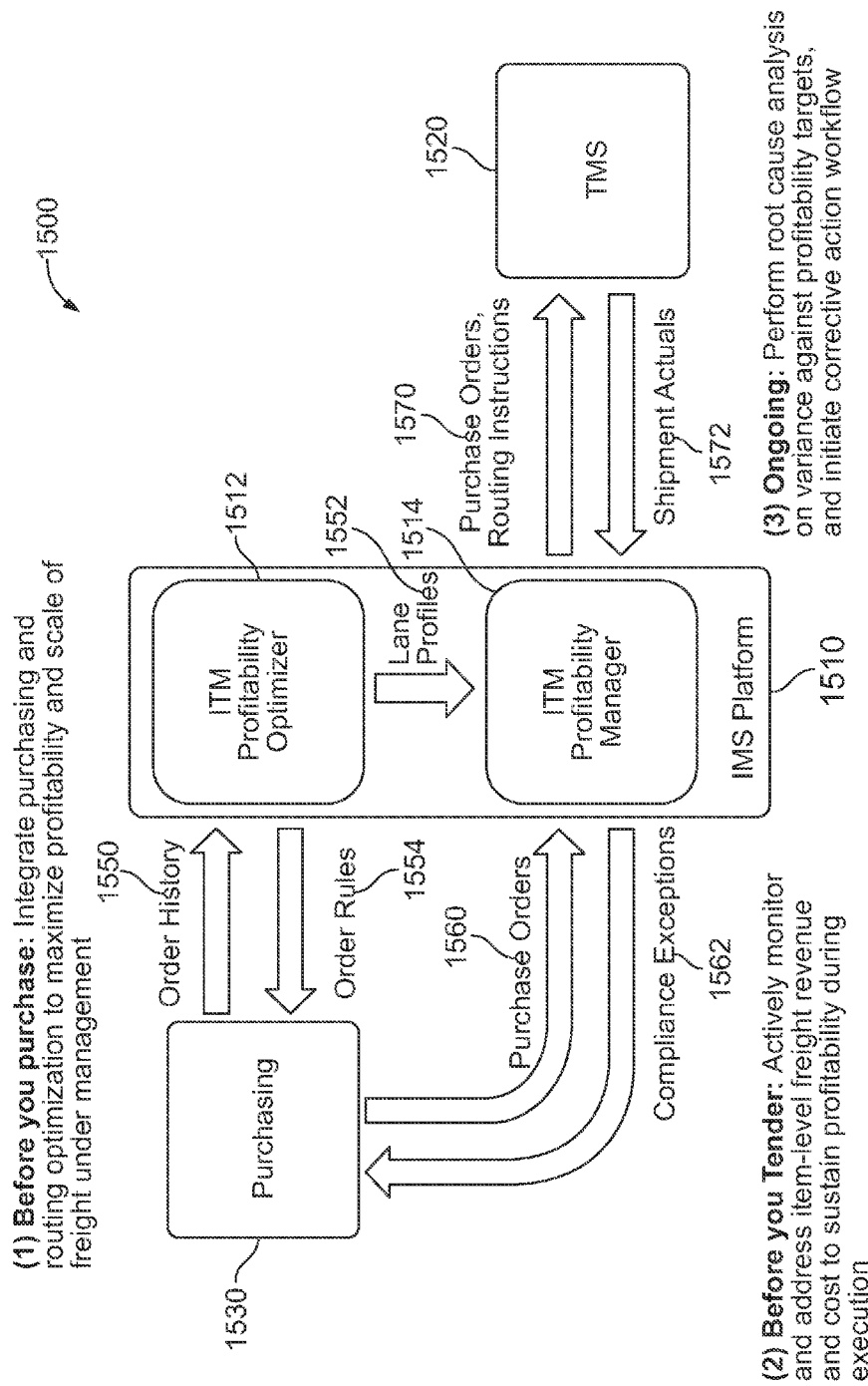
FIG. 15 illustrates a business information flow according to the present Inbound Transportation Management (ITM) system.

FIG. 15 illustrates a business information flow 1500 according to the present Inbound Transportation Management (ITM) system. The business flow 1500 includes an Information Management System (IMS) Platform 1510 including an ITM Profitability Optimizer 1512 and an ITM Profitability manager 1514. The business flow 1500 also includes a Transportation Management System (TMS) 1520 and the Purchasing department 1530.

As described above, order history 1550 is passed to the ITM Profitability Optimizer 1512 which generates a solution of optimized logistics representing a set of lane profiles 1552 and passes the lane profiles to the ITM Profitability Manager 1514. Additionally, the ITM Profitability Optimizer 1512 passes order rules 1554 back to the Purchasing department.

The purchasing department 1530 then places orders 1560 with the ITM Profitability Manager 1514. The ITM Profitability Manager 1514 identifies exceptions to the lane profile in the purchase orders 1560 and passes an identification of exceptions 1562 back to the purchasing department for review and potential modification to conform to the optimized lane profile.

Once the compliance exceptions have been resolved, the ITM Profitability Manager 1514 relays purchase orders and routing instructions 1570 to the TMS 1520. The ITM Profitability Manager 1514 also receives data with regard to the actual shipments 1572 back from the TMS 1520. The received data may be used to recalculate a new optimal lane pattern or to perform a root cause analysis on variance against profitability targets and initiate corrective action.

Figure 16:
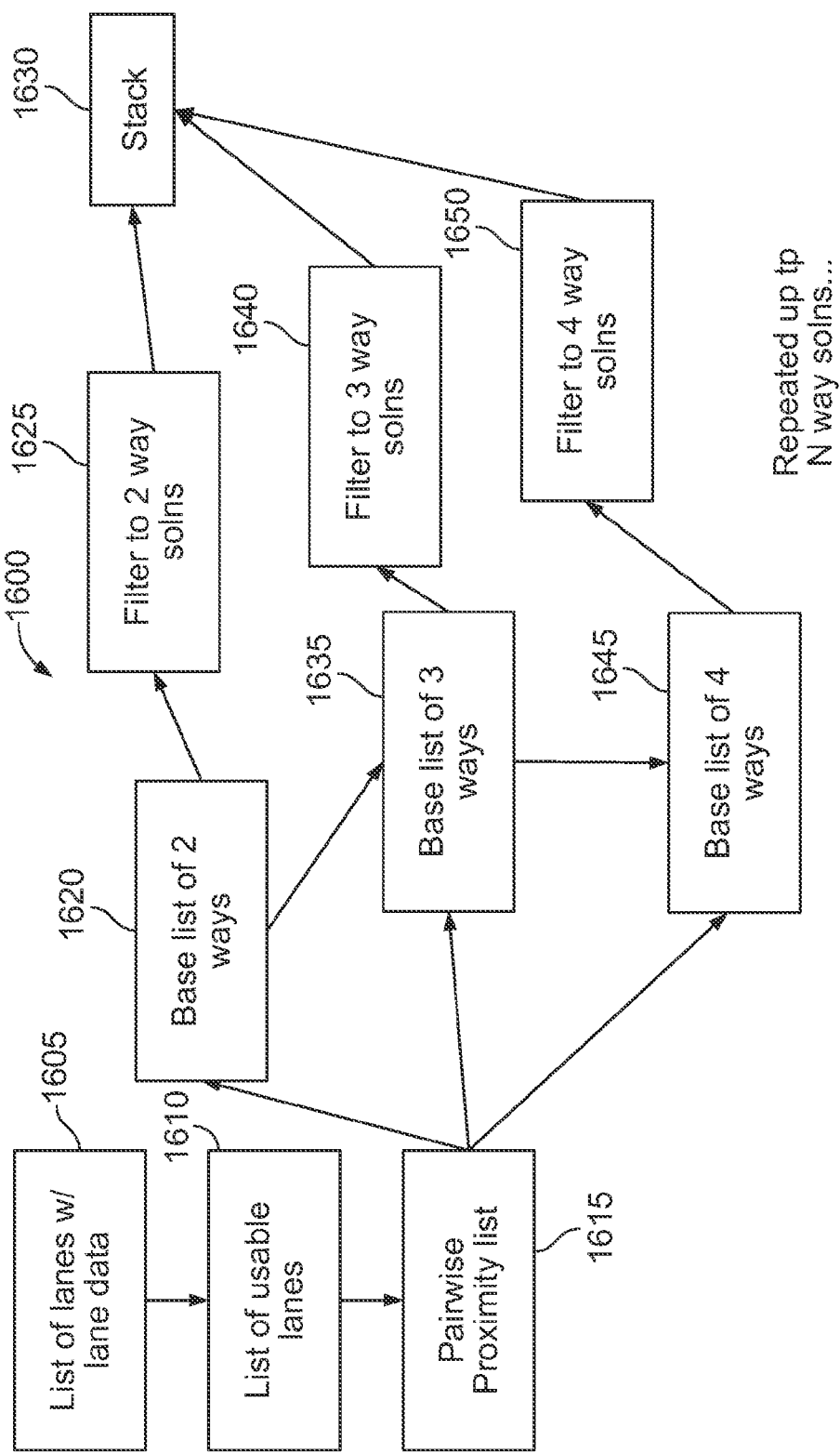
FIG. 16 illustrates the combo model stack generation process according to an embodiment of the present invention.

FIG. 16 illustrates the combo model stack generation process according to an embodiment of the present invention. The combo model 204 was referenced in FIG. 2. In general, as further described below, the combo model stack generation process first filters the lanes, then creates a proximity list of pairs of lanes, then creates a list of base 2 lane combos, then filters to solution the list for 2 way combos, then creates a list of base 3 lane combos, then filters to solution the list for 3 way combos, and repeats the process up until the N-way combos where N is pre-selected by a user.

Turning to FIG. 16, first, at step 1605 the list of lanes with lane data is compiled. Next at step 1610, the total list of lanes is filtered to selects a list of usable lanes. Lanes may be unusable for several reasons, such as a shipment date outside the current stack date.

Next, at step 1615, a pairwise proximity list is formed. Proximity is preferably defined by the distance between picks and drops. The distance is preferably calculated by using the havesine formula:

$$a = \sin^2(\Delta lat/2) + \cos(lat_1) * \cos(lat_2) * \sin^2(\Delta long/2)$$

$$c = 2*a \tan 2(\sqrt{a}, \sqrt{(1-a)})$$

$$d = R*c \text{ where } R \text{ is earth's radius}$$

The pairwise proximity list is then used to form a base list of 2 way solutions at step 1620. Solutions may be filtered out at step 1625 if the proximity exceeds a value set by the user or for other reasons described below. The remaining solutions are added to the stack 1630.

Additionally, the model may filter out a solution based on one or more of the following: out of route miles, value of revenue on lane, value on lane vs cost on lane, quantity on trucks, margin, or other criteria. The model may also provide exact filtering based on whether lanes are reviewed in order by length, by revenue, or by quantity on truck.

Alternatively, solutions may be filtered out based on zip code regions. For example, the distance between a zip code in CA and a zip code from NJ is available from a lookup table or other database, and may be directly compared to the desired proximity.

With regard to the three-way base list, the three way base list is created by adding lanes to the two way list a step 1635 and then filtering the lanes for the desired solutions at step 1640. These lanes may be selected based on the proximity list and is preferably in proximity for both current lanes in the list. Similarly, a four way base list may be constructed by adding an additional lane to the three way base list using the proximity list at step 1645 and proximity for the previous lanes on the list and then filtering the list at step 1650. This process may be repeated up to an N-way base list where N may be set by the user. The stack 1630 of all available solutions may then be reviewed and ordered by a criteria such as margin to obtain the desired solution.

With regard to calculating margin, the solutions described above preferably include a calculation of margin as well. Margin is viewed as revenue minus cost. In this case, the cost estimate is based on dollar per mile cost for traveling from the pick up to the drop off point supplied in original data times the total miles for the shortest route.

Further, when determining the combo, the transported products are treated as first in last out so that the last product loaded on the truck is the first product out. However, in an alternative embodiment, it is allowed to remove this constraint. Additionally, in the combo model, there is preferably always a lane in the combo where the pick up for the lane is the first pick up for the route and the drop off for the lane is the last drop off for the route.

Additionally, in the model, the route is determined optimally by examining combinations with reductions due to the final lane in route being constrained to be shorter than initial lane in route. If not, then one can simply reverse the entire pick sequence and get a shorter total route, which implies that the route was not optimal. This cuts the number of potential combinations in half. For example if lane A>lane B>lane C in length then only need to check ABC, ACB, and BAC.

Additionally, a combo may be included in the list of bases but not in the list of solutions because the margin is too low for the solution. Additionally, a combo might be excluded from the list of bases because it has such a low margin that no possible future lanes will bring the value up to the required threshold margin.

With regard to calculating frequency, the following formulas may be employed:

OptFreq=max(min(total monthly weight/max weight per truck,total monthly cube/max cube per truck, total monthly pallets/max cube per pallet),MinFreq)

Total monthly weight=sum of weight over all items over all lanes

Total monthly cube=sum of cube over all items over all lanes

Total monthly pallet=sum of pallets over all items over all lanes

MinFreq=min(max(historical freq by lane),1/max time between orders)

max time between orders=preset value based on inventory requirements, can be a function of temp max(historical freq by lane)=largest freq on any individual lane Additionally, frequency may be restricted if a lane is marked as "do not flex". In such a situation, the frequency of the solution is not allowed to drop below the current frequency of the lane.

For example, if Lane A is marked as "do not flex", and the frequency for lane A=freqA then MinFreq=max(min(max (historical freq by lane for lanes that can be flexed), 1/max time between orders), max(historical freq by lane for lanes that cannot be flexed)).

In an alternative embodiment to the Inbound Transportation Management (ITM) System discussed above, the ITM system may be operated to optimize freight profit, instead of just freight cost, within the Lane Level Logistics Routing Optimization models For example, in the discussion above, the modeling processor may also receive information with regard to freight allowances. Freight allowances are sums paid by a shipper such as a manufacturer as the expected cost of shipping the product to the destination. If the purchaser's actual cost of shipping the product to the destination is less than the freight allowance, the purchaser is typically still entitled to keep the whole freight allowance. Consequently, shipping may be able to become a profit center.

When freight allowances are available, the modeling processor above may attempt to simultaneously optimize revenue based on freight rates (freight allowances) and transportation costs to maximize profit. That is, the determined optimal solution may take advantage of freight rates where profitable.

Additionally, the present alternative embodiment also preferably includes the capability to measure incremental profit vs other optimization solutions as well.

As described above, one or more embodiments of the present invention provide optimization of order and routing patterns that solves for optimal freight margin, not just freight cost. The system incorporates freight allowance information, which often varies item by item, in determining the impact of new ordering and routing solutions. By doing so, the system assures that optimization objectives are based on freight impact to total landed product cost, not load freight costs, which can hide the true total dollar impact. Consideration for freight margin enables determination of lanes to bring under management.

Optimization results are translated into performance targets based on freight margin, not just freight expense. These targets provide a benchmark against which operations performance can be measured as solutions are used to drive actual ordering and routing patterns.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A system for computerized logistics management, the system comprising:
a data import computer system, the data import computer system configured to electronically receive a current inbound order history data for a receiver of goods, wherein the current inbound order history data represents the order history for a predetermined order history time, the current inbound order history data comprising:
a first product order frequency, wherein the first product order frequency is the number of times at least one shipment of a first product takes place during the predetermined order history time;
a first product amount, wherein the first product amount is the amount of the first product contained in each of the at least one shipment of the first product;
a first product freight cost, wherein the first product freight cost is the product freight cost of each of the at least one shipment of the first product;
a first product freight allowance, wherein the first product freight allowance is associated with the at least one shipment of the first product, and wherein the first product freight allowance is per unit amount of said first product included in each of the at least one shipment of the first product;
a second product order frequency, wherein the second product order frequency is the number of times at least one shipment of a second product takes place during the predetermined order history time;

a second product amount, wherein the second product amount is the amount of the second product contained in each of the at least one shipment of the second product;

a second product freight cost, wherein the second product freight cost is the product freight cost of each of the at least one shipment of the second product; and a second product freight allowance, wherein the second product freight allowance is associated with the at least one shipment of the second product, and wherein the second product freight allowance is per unit amount of said second product included in each of the at least one shipment of the second product;

a modeling computer system, the modeling computer system configured to perform steps comprising:

determining the first product total shipment profit by multiplying the first product freight allowance by the first product amount, and then subtracting the first product freight cost from the result;

determining the second product total shipment profit by multiplying the second product freight allowance by the second product amount, and then subtracting the second product freight cost from the result;

determining a current profitability for the predetermined order history time based on the first product order frequency multiplied by the first product total shipment profit, and the second product order frequency multiplied by the second product total shipment profit;

altering at least one of the first product order frequency, the first product amount, the second product order frequency, and the second product amount, wherein after the alteration, a result first product order frequency is set equal to the first product order frequency, a result first product amount is set equal to the first product amount, a result second product order frequency is set equal to the second product order frequency, and a result second product amount is set equal to the second product amount;

determining a result first product freight allowance, wherein the result first product freight allowance is associated with the at least one shipment of the result first product amount, and wherein the result first product freight allowance is per unit amount of the first product included in each of the at least one shipment of the result first product amount;

determining a result second product freight allowance, wherein the result second product freight allowance is associated with the at least one shipment of the result second product amount, and wherein the result second product freight allowance is per unit amount of the second product included in each of the at least one shipment of the result second product amount;

determining a result first product total shipment profit by multiplying the result first product freight allowance by the result first product amount, and then subtracting the first product freight cost from the result;

determining a result second product total shipment profit by multiplying the result second product freight allowance by the result second product amount, and then subtracting said second product freight cost from the result;

determining a result profitability based on the result first product order frequency multiplied by the result first product total shipment profit, and the result second product order frequency multiplied by the result second product total shipment profit; and determining that the result profitability is greater than the current profitability; and a purchasing computer system, the purchasing computer system configured to perform steps comprising:

receiving the result first product order frequency, the result first product amount, the result second product order frequency, and the result second product amount; and initiating a plurality of orders based on the result first product order frequency, the result first product amount, the result second product order frequency, and the result second product amount.

2. The system of claim 1, wherein the first product is shipped from a first shipper, and wherein the second product is shipped from a second shipper that is different from the first shipper.

3. The system of claim 1, wherein at least one of the first product and the second product is shipped to a plurality of receivers.

4. A method for computerized logistics optimization, the method comprising:

electronically receiving a current inbound order history data for a receiver of goods, wherein the current inbound order history data represents the order history for a predetermined order history time, the current inbound order history data comprising:

a first product order frequency, wherein the first product order frequency is the number of times at least one shipment of a first product takes place during the predetermined order history time;

a first product amount, wherein the first product amount is the amount of the first product contained in each of the at least one shipment of the first product;

a first product freight cost, wherein the first product freight cost is the product freight cost of each of the at least one shipment of the first product;

a first product freight allowance, wherein the first product freight allowance is associated with the at least one shipment of the first product, and wherein the first product freight allowance is per unit amount of said first product included in each of the at least one shipment of the first product;

a second product order frequency, wherein the second product order frequency is the number of times at least one shipment of a second product takes place during the predetermined order history time;

a second product amount, wherein the second product amount is the amount of the second product contained in each of the at least one shipment of the second product;

a second product freight cost, wherein the second product freight cost is the product freight cost of each of the at least one shipment of the second product; and a second product freight allowance, wherein the second product freight allowance is associated with the at least one shipment of the second product, and wherein the second product freight allowance is per unit amount of said second product included in each of the at least one shipment of the second product;

determining the first product total shipment profit by multiplying the first product freight allowance by the first product amount, and then subtracting the first product freight cost from the result;

determining the second product total shipment profit by multiplying the second product freight allowance by the second product amount, and then subtracting the second product freight cost from the result;

determining a current profitability for the predetermined order history time based on the first product order frequency multiplied by the first product total shipment profit, and the second product order frequency multiplied by the second product total shipment profit;

altering at least one of the first product order frequency, the first product amount, the second product order frequency, and the second product amount, wherein after the alteration, a result first product order frequency is set equal to the first product order frequency, a result first product amount is set equal to the first product amount, a result second product order frequency is set equal to the second product order frequency, and a result second product amount is set equal to the second product amount;

determining a result first product freight allowance, wherein the result first product freight allowance is associated with the at least one shipment of the result first product amount, and wherein the result first product freight allowance is per unit amount of the first product included in each of the at least one shipment of the result first product amount;

determining a result second product freight allowance, wherein the result second product freight allowance is associated with the at least one shipment of the result second product amount, and wherein the result second product freight allowance is per unit amount of the second product included in each of the at least one shipment of the result second product amount;

determining a result first product total shipment profit by multiplying the result first product freight allowance by the result first product amount, and then subtracting the first product freight cost from the result;

determining a result second product total shipment profit by multiplying the result second product freight allowance by the result second product amount, and then subtracting said second product freight cost from the result;

determining, by a computer system, a result profitability based on the result first product order frequency multiplied by the result first product total shipment profit, and the result second product order frequency multiplied by the result second product total shipment profit; and determining that the result profitability is greater than the current profitability;

receiving the result first product order frequency, the result first product amount, the result second product order frequency, and the result second product amount; and initiating a plurality of orders based on the result first product order frequency, the result first product amount, the result second product order frequency, and the result second product amount.

5. The method of claim 4, wherein the first product is shipped from a first shipper, and wherein the second product is shipped from a second shipper that is different from the first shipper.

6. The method of claim 4, wherein at least one of the first product and the second product is shipped to a plurality of receivers.

* * * * *

UNITED STATES PATENT AND TRADEMARK OFFICE
CERTIFICATE OF CORRECTION

PATENT NO.         : 8,799,178 B2
APPLICATION NO.    : 13/357393
DATED              : August 5, 2014
INVENTOR(S)        : Lavoie et al.

Page 1 of 1

It is certified that error appears in the above-identified patent and that said Letters Patent is hereby corrected as shown below:

Title Page: Item 75
The name of the fifth (5th) inventor is shown as Boyett Judgson Hennington, IV and is incorrectly spelled. It should read Boyett Judson Nennington, IV.

Signed and Sealed this
Second Day of June, 2015

Michelle K. Lee
*Director of the United States Patent and Trademark Office*

UNITED STATES PATENT AND TRADEMARK OFFICE
CERTIFICATE OF CORRECTION

PATENT NO.         : 8,799,178 B2                                       Page 1 of 1
APPLICATION NO.    : 13/357393
DATED              : August 5, 2014
INVENTOR(S)        : Lavoie et al.

It is certified that error appears in the above-identified patent and that said Letters Patent is hereby corrected as shown below:

Title Page: Item 75
The name of the fifth (5th) inventor is shown as Boyett Judgson Hennington, IV and is incorrectly spelled. It should read Boyett Judson Hennington, IV.

This certificate supersedes the Certificate of Correction issued June 2, 2015.

Signed and Sealed this
Twenty-seventh Day of October, 2015

Michelle K. Lee
*Director of the United States Patent and Trademark Office*